(12) United States Patent
Kim et al.

(10) Patent No.: US 12,501,342 B2
(45) Date of Patent: Dec. 16, 2025

(54) PDU SESSION MANAGEMENT METHOD

(71) Applicant: LG ELECTRONICS INC., Seoul (KR)

(72) Inventors: Seokjung Kim, Seoul (KR); Laeyoung Kim, Seoul (KR); Myungjune Youn, Seoul (KR); Jian Xu, Seoul (KR); Daewook Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 420 days.

(21) Appl. No.: 18/033,286

(22) PCT Filed: Mar. 24, 2022

(86) PCT No.: PCT/KR2022/004106
§ 371 (c)(1),
(2) Date: Apr. 21, 2023

(87) PCT Pub. No.: WO2022/215909
PCT Pub. Date: Oct. 13, 2022

(65) Prior Publication Data
US 2023/0397086 A1    Dec. 7, 2023

(30) Foreign Application Priority Data

Apr. 6, 2021  (KR) .................. 10-2021-0044830
May 3, 2021   (KR) .................. 10-2021-0057490
May 12, 2021  (KR) .................. 10-2021-0061232

(51) Int. Cl.
*H04W 40/24*    (2009.01)
*H04W 28/08*    (2023.01)
(Continued)

(52) U.S. Cl.
CPC ....... *H04W 40/24* (2013.01); *H04W 28/0925* (2020.05); *H04W 76/12* (2018.02); *H04W 76/15* (2018.02)

(58) Field of Classification Search
CPC . H04W 40/24; H04W 28/0925; H04W 76/12; H04W 76/15; H04W 76/11; H04W 60/00; H04W 80/10; Y02D 30/70
See application file for complete search history.

(56) References Cited

U.S. PATENT DOCUMENTS

2023/0156831 A1*  5/2023  Zhang .................. H04W 76/12
                                                        370/329
2023/0370944 A1* 11/2023  Li ..................... H04W 28/0263
2024/0007925 A1*  1/2024  Li ..................... H04W 76/15

FOREIGN PATENT DOCUMENTS

WO    20/256425 A1    12/2020

OTHER PUBLICATIONS

Huawei, et al; "UE providing PDU Session Pair ID based on URSP rules"; May 10, 2021; 3GPP TSG-WG SA2 Meeting #145E e-meeting; S2-2104501; pp. 1-8. (Year: 2021).*

(Continued)

*Primary Examiner* — Robert C Scheibel
(74) *Attorney, Agent, or Firm* — BRYAN CAVE LEIGHTON PAISNER LLP

(57) ABSTRACT

One disclosure of the present specification provides a method by which a policy control function (PCF) performs communication. The method comprises the steps of: receiving a UE policy association establishment (UE association establishment) message from an access and mobility management function (AMF); and transmitting a UE route selection policy (URSP) rule to a user equipment (UE), wherein the URSP rule includes a first route selection descriptor (RSD) and a second RSD, the first RSD includes a protocol data unit (PDU) session pair identifier (ID), the (Continued)

PDU session pair ID is used to establish two redundant PDU sessions, and the second RSD does not include the PDU session pair ID.

13 Claims, 17 Drawing Sheets

(51) Int. Cl.
  *H04W 76/12* (2018.01)
  *H04W 76/15* (2018.01)

(56) References Cited

OTHER PUBLICATIONS

Huawei, et al; "PDU Session Pair Information provisioning to RAN"; Apr. 6, 2021; 3GPP TSG-SA WG2 Meeting #144E (e-meeting); S2-2102511; pp. 1-5. (Year: 2021).*

Huawei, Discussion on how to trigger redundant PDU Session establishment for the same application, S2-1903472, 3GPP TSG-SA2 Meeting #132, Apr. 2, 2019.

Huawei, Redundant PDU Session establishment for the same application, S2-1903474, 3GPP TSG-SA2 Meeting #132, Apr. 2, 2019.

OPPO, Clarification to support associating URLLC traffic to redundant PDU session, S2-1904656, 3GPP TSG-SA2 Meeting #132, Apr. 11, 2019.

Nokia, Update to UE procedure for associating applications to PDU Sessions based on URSP, S2-185129, 3GPP TSG-SA2 Meeting #127b, May 22, 2018.

LG Electronics, "Clarification on PDU session pair information to NG-RAN (Option 2)", GPP TSG-SA2 Meeting #135, Split, Croatia, Aug. 4, 2019-Aug. 18, 2019, S2-1909856.

Hisilicon, "UE providing PDU Session Pair ID based on URSP rules", 3GPP TSG-WG SA2 Meeting #145E e-meeting, Elbonia, May 17-28, 2021, S2-2104501.

LG Electronics Inc., "(TP for NR_IIOT BL CR for TS 38.413): Introduction of Redundant Transmission Information for Solution #1", R3-202277, 3GPP TSG-RAN WG3 #107bis-e, E-Meeting, Apr. 20-30, 2020.

Third Generation Partnership Project; Technical Specification Group Services and System Aspects; System architecture for the 5G System (5GS); Stage 2 (Release 17), 3GPP TS23.501 v17.0.0 (Mar. 2021).

LG Electronics Inc., "Clarification on PDU session pair information to NG-RAN", S2-1911235, 3GPP TSG-SA2 Meeting #136, Reno, NV, USA, Nov. 18, 2019-Nov. 22, 2019.

* cited by examiner

PDU SESSION MANAGEMENT METHOD

CROSS-REFERENCE TO RELATED APPLICATIONS

This application is the National Stage filing under 35 U.S.C. 371 of International Application No. PCT/KR2022/004106, filed on Mar. 24, 2022, which claims the benefit of Korean Patent Application No. 10-2021-0044830 filed on Apr. 6, 2021, and Korean Patent Application No. 10-2021-0057490 filed on May 3, 2021, and Korean Patent Application No. 10-2021-0061232 filed on May 12, 2021, which is hereby incorporated by reference herein in its entirety.

TECHNICAL FIELD

The present specification relates to mobile communications.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

SUMMARY

A network needs to comprehensively manage a terminal that does not support a PDU session pair ID and a terminal that supports a PDU session pair ID.

A URSP rule for a terminal supporting a PDU session pair ID and a URSP rule for a terminal not supporting a PDU session pair ID may be created and transmitted to the terminal.

The present specification may have various effects.

For example, through the procedure disclosed in this specification, the network can establish a redundant PDU session by integrally managing a terminal that supports a PDU session pair ID and a terminal that does not support a PDU session pair ID.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

DETAILED DESCRIPTION

Figure 1:
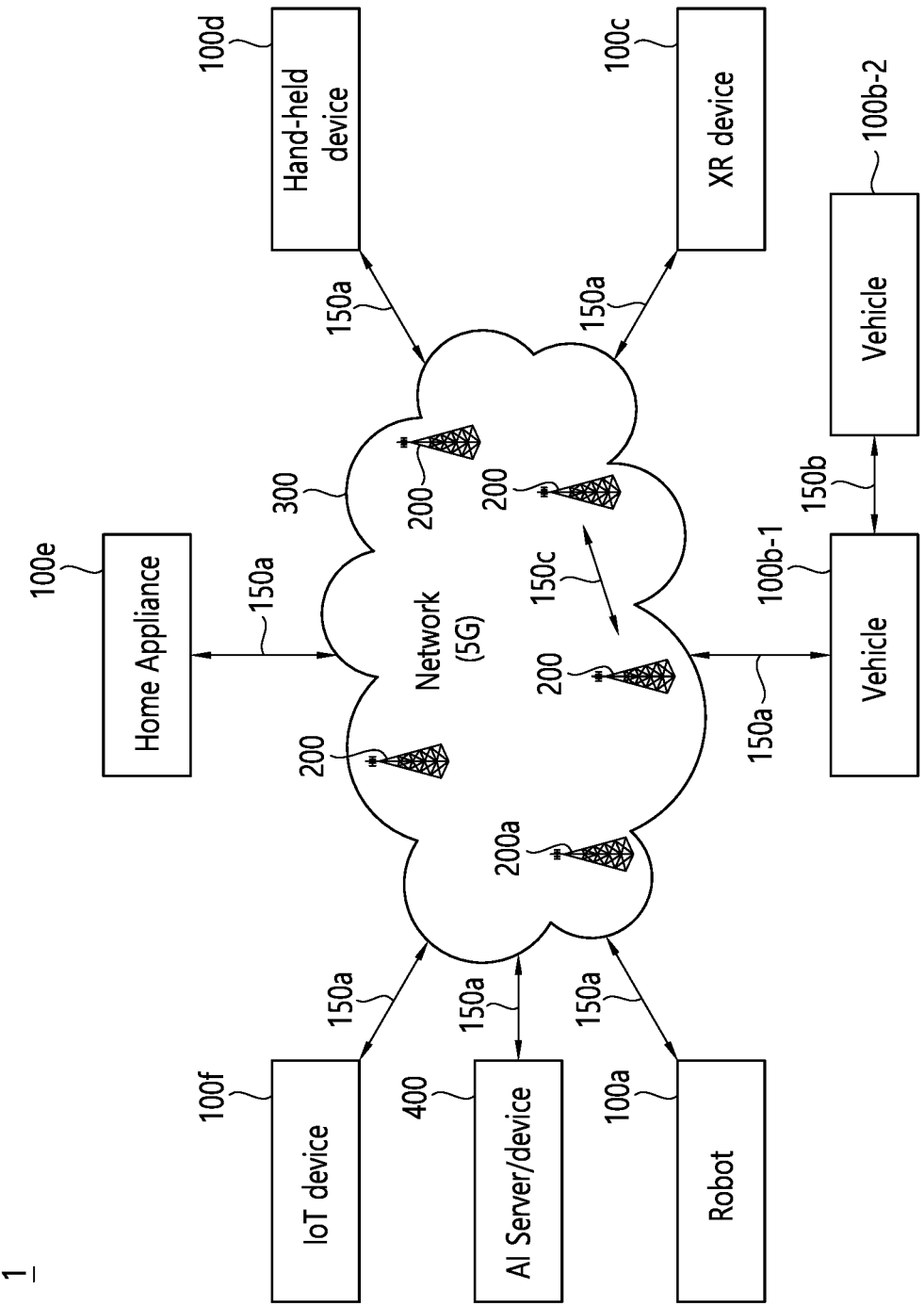
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
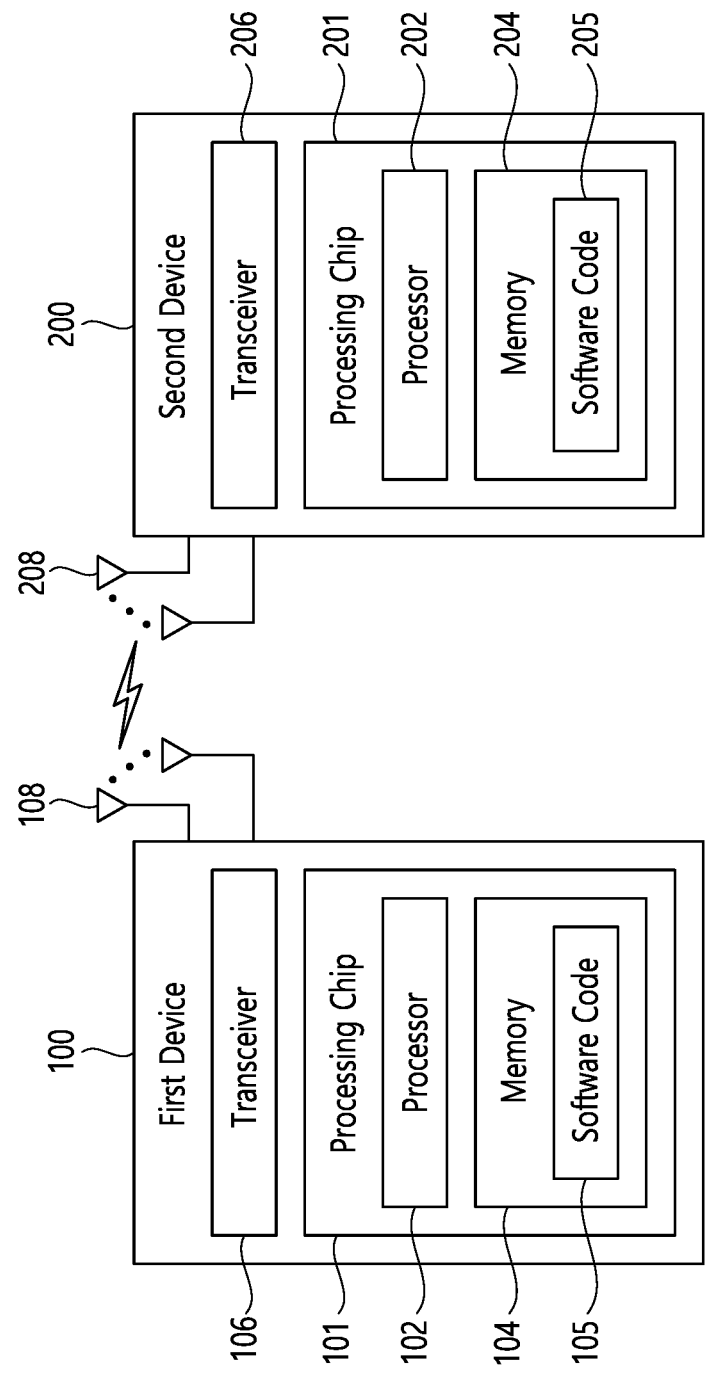
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure.

For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
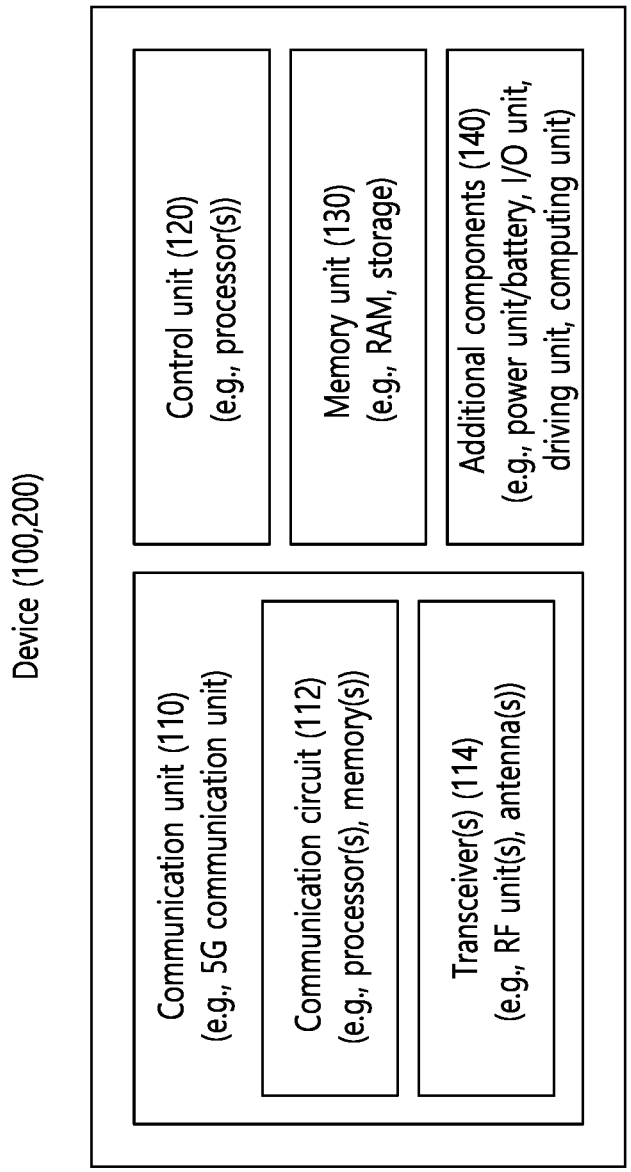
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
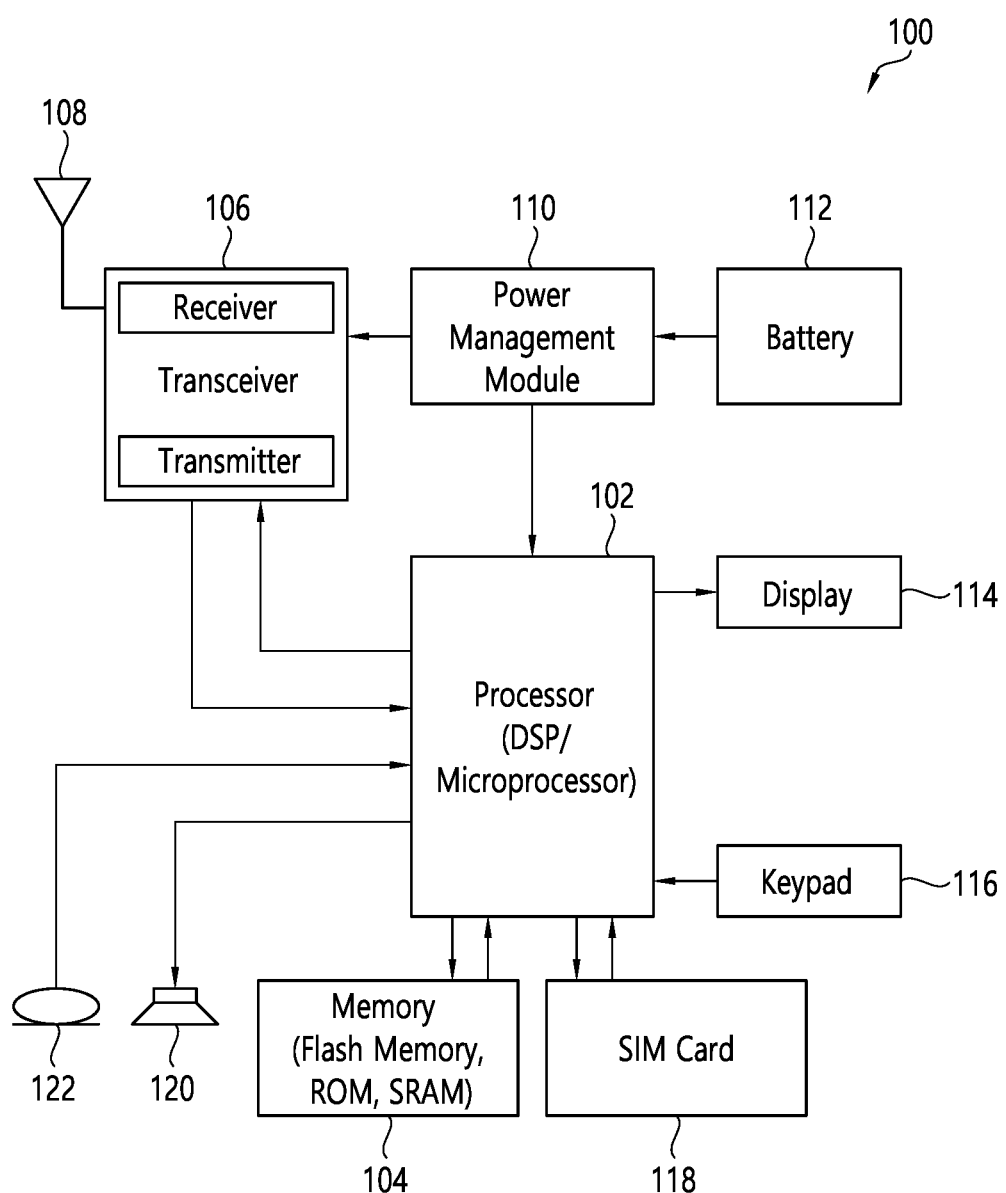
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, a series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

<Redundant PDU Session>

In order to support highly reliable URLLC (ultra reliable and low latency communication) service, the terminal may set up two redundant PDU sessions over the 5G network. It may be used for applications that require reliability. Two PDU sessions may be established and managed by different network nodes. The same data may be transmitted through the two PDU sessions.

The 5GS may set up the user plane paths of the two redundant PDU Sessions to be disjoint. The user's subscription indicates if user is allowed to have redundant PDU Sessions and this indication may be provided to SMF from UDM.

RAN supports dual connectivity, and there may be sufficient RAN coverage for dual connectivity in the target area. UEs may support dual connectivity. The core network UPF deployment may be aligned with RAN deployment and may support redundant user plane paths. The underlying transport topology may be aligned with the RAN and UPF deployment and may support redundant user plane paths. The physical network topology and geographical distribution of functions may also support the redundant user plane paths to the extent deemed necessary by the operator. The operation of the redundant user plane paths may be made sufficiently independent, to the extent deemed necessary by the operator.

Figure 5:
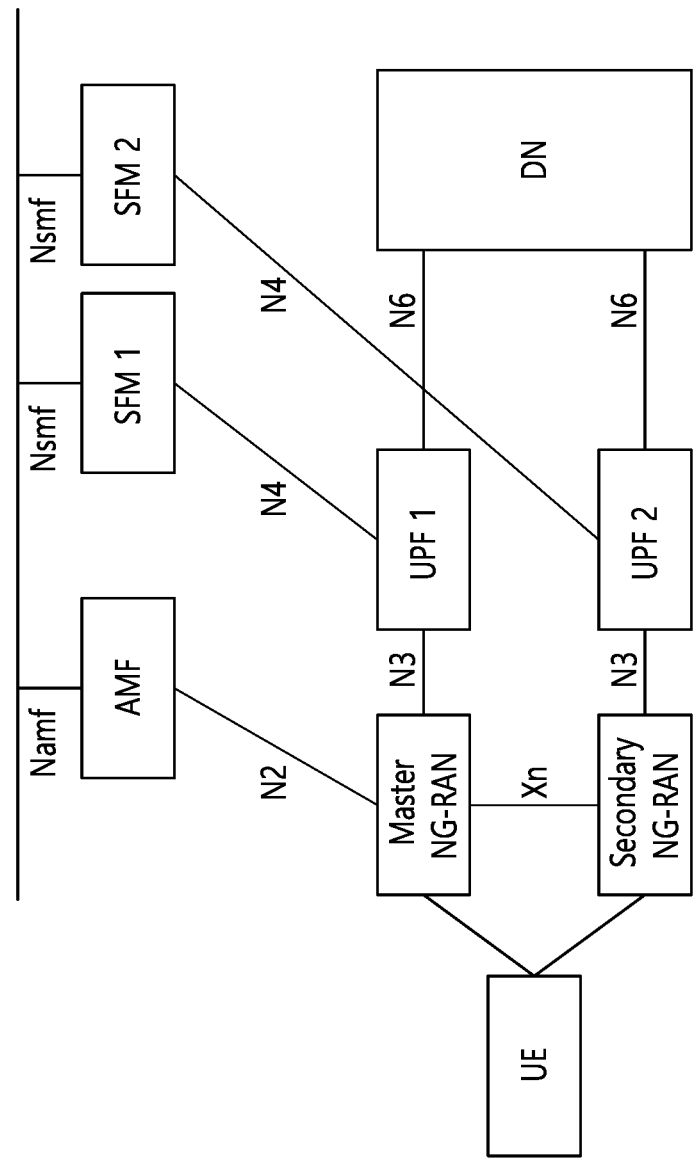
FIG. 5 shows an example of a redundant user plane path using dual connectivity.

FIG. 5 shows an example of a redundant user plane path using dual connectivity.

FIG. 5 illustrates an example user plane resource configuration of dual PDU Sessions when redundancy is applied. One PDU Session spans from the UE via Master NG-RAN to UPF1 acting as the PDU Session Anchor, and the other PDU Session spans from the UE via Secondary NG-RAN to UPF2 acting as the PDU Session Anchor. NG-RAN may realize redundant user plane resources for the two PDU Sessions with two NG-RAN nodes (i.e. Master NG-RAN and Secondary NG-RAN) or a single NG-RAN node. In both cases, there is a single N1 interface towards AMF.

Based on these two PDU Sessions, two independent user plane paths may be set up. UPF1 and UPF2 connect to the same Data Network (DN), even though the traffic via UPF1 and UPF2 may be routed via different user plane nodes within the DN.

In order to establish two redundant PDU Sessions and associate the duplicated traffic coming from the same application to these PDU Sessions, URSP or UE local configuration may used.

Using URSP, duplicated traffic from the application, associated to the redundant PDU Sessions, is differentiated by two distinct traffic descriptors, each in a distinct URSP rule. These traffic descriptors need to have different DNNs, IP descriptors or non-IP descriptors (e.g. MAC address, VLAN ID), so that the two redundant PDU Sessions are matched to the Route Selection Descriptors of distinct URSP rules.

The redundant user plane set up may applie to both IP and Ethernet PDU Sessions.

Support of redundant PDU Sessions include:

UE may initiate two redundant PDU Sessions and may provide different combination of DNN and S-NSSAI for each PDU Session.

The SMF may determine whether the PDU Session is to be handled redundantly. The determination is based on the indication that redundant PDU Session is required provided by PCF for the PDU Session, if dynamic PCC (Policy and Charging Control) applies for the PDU Session or the combination of the S-NSSAI, DNN, user subscription and local policy configuration in the SMF if dynamic PCC is not used for the PDU Session. If the PDU session is to be handled redundantly, the SMF uses S-NSSAI, DNN to determine the RSN value which differentiates the PDU Sessions that are handled redundantly and indicates redundant user plane requirements for the PDU Sessions in NG-RAN.

Operator configuration of UPF selection may ensures the appropriate UPF selection for disjoint paths.

At establishment of the PDU Sessions or at transitions to CM-CONNECTED state, the RSN parameter may indicate to NG-RAN that redundant user plane resources shall be provided for the given PDU Sessions by means of dual connectivity. The value of the RSN parameter may indicate redundant user plane requirements for the PDU Sessions. This request for redundant handling may be made by indicating the RSN to the NG-RAN node on a per PDU Session granularity. PDU Sessions associated with different RSN values shall be realized by different, redundant UP resources. Based on the RSN and RAN configuration, the NG-RAN sets up dual connectivity so that the sessions have end to end redundant paths. When there are multiple PDU Sessions with the RSN parameter set and with different values of RSN, this indicates to NG-RAN that CN is requesting dual connectivity to be set up and the user plane shall be handled as indicated by the RSN parameter and the associated RAN configuration. If the RSN value is provided to the NG-RAN, NG-RAN shall consider the RSN value when it associates the PDU Sessions with NG-RAN UP.

The decision to set up dual connectivity may remain in NG-RAN. NG-RAN may take into account the additional request for the dual connectivity setup provided by the CN.

Using NG-RAN local configuration, NG-RAN may determine whether the request to establish RAN resources for a PDU Session is fulfilled or not considering user plane requirements indicated by the RSN parameter by means of dual connectivity. If the request to establish RAN resources for PDU Session can be fulfilled by the RAN, the PDU Session may be established even if the user plane requirements indicated by RSN cannot be satisfied. If the NG-RAN determines the request to establish RAN resources cannot be fulfilled then it shall reject the request which eventually triggers the SMF to reject the PDU Session establishment towards the UE. The decision for each PDU Session may be taken independently. That is, rejection of a PDU Session request shall not release the previously established PDU Session. The RAN shall determine whether to notify the SMF if the RAN resources indicated by the RSN parameter can no longer be maintained and SMF can use that to determine if the PDU Session should be released.

In the case of Ethernet PDU Sessions, the SMF has the possibility to change the UPF (acting as the PSA) and the Secondary NG-RAN is modified (or added/released), using the Ethernet PDU Session Anchor Relocation procedure.

The SMFs charging record may reflect the RSN information.

The RSN indication is transferred from Source NG-RAN to Target NG-RAN in the case of handover.

A UE route selection policy (URSP) will be described.

When user data traffic is generated in the UE, which PDU session to transmit it may be determined by the URSP of the UE. A URSP may include one or more URSP rules indicating requested actions according to traffic. Each URSP rule may consist of a rule precedence, a traffic descriptor (TD) corresponding to the rule criteria, and a route selection descriptor (RSD) corresponding to the action according to each URSP rule, etc.

(1) Rule Priority

Determines the order in which URSP rules are enforced in the UE. That is, the rule priority identifies the priority of a URSP rule among all existing URSP rules. Each URSP rule within a URSP has a different priority value.

(2) Traffic Descriptor

Each URSP rule contains a TD that determines when the URSP rule is applied. A TD includes one or more components which will be described below. A URSP rule is determined to apply when all elements in the TD match corresponding information from the application. A URSP rule is determined not to apply for a given element within the TD when:
 when the corresponding information from the application is not available; or
 When the corresponding information from the application does not match the value of the TD component If a URSP rule containing a TD with more than one component is provided, it is recommended to provide a lower priority URSP rule and a TD with fewer components to increase the likelihood of matching the URSP rule for a particular application.

TD includes any of the following:
1) a match-all traffic descriptor; or
2) at least one of the following components:
 a) one or more application IDs;
 b) one or more IP 3-tuples, i.e. destination IP address, destination port number, and protocol in use above IP;
 c) one or more non-IP descriptors, i.e. destination of non-IP traffic;
 d) one or more DNNs;
 e) one or more connection capabilities; and
 f) one or more domain descriptors, i.e., the target fully qualified domain name (FQDN);

(3) One or More RSDs;

Each URSP rule contains a list of RSDs containing one or more RSDs. Each RSD has a different RSD priority value. RSD includes one or more of the following components:

SSC (session and service continuity) mode: Indicates that matching application traffic should be routed through a PDU session that supports the included SSC mode.

Network slice selection: Indicates that it should be routed through the PDU session supporting S-NSSAI including the traffic of the matching application. Contains one or more S-NSSAIs.

DNN selection: Indicates that it should be routed through a PDU session that supporting DNN including the traffic of the matching application. Contains one or more DNNs. When a DNN is used in TD, the RSD of the corresponding URSP rule does not include the DNN selection component.

PDU Session Type Selection: Indicates that it should be routed through a PDU session that supports the PDU session type including the traffic of the matching application.

Non-smooth offload indication: Indicates that the traffic of a matching application is offloaded to a non-3GPP connection outside the PDU session when the URSP rule is applied. If this element is in the RSD, other elements are not included in the RSD.

Access type preference: Indicates the connection type (3GPP or non-3GPP or multiple access) for which the PDU session should be established when the UE needs to establish a PDU session when the URSP rule is applied. The multi-access type indicates that the PDU session should be established as an MA PDU session using both 3GPP access and non-3GPP access.

Time window: RSD is considered invalid if the UE is not within the time window.

Location Criteria: If the location of the UE does not match the location criteria, the RSD is considered invalid.

Table 3 shows an example of RSD.

TABLE 3

| Information name | Description | Category | PCF permitted to modify in URSP | Scope |
|---|---|---|---|---|
| Route Selection Descriptor Precedence | Determines the order in which the Route Selection Descriptors are to be applied. | Mandatory | Yes | UE context |
| Route selection components | | Mandatory | | |

TABLE 3-continued

| Information name | Description | Category | PCF permitted to modify in URSP | Scope |
|---|---|---|---|---|
| SSC Mode Selection | One single value of SSC mode. | Optional | Yes | UE context |
| Network Slice Selection | Either a single value or a list of values of S-NSSAI(s). | Optional | Yes | UE context |
| DNN Selection | Either a single value or a list of values of DNN(s). | Optional | Yes | UE context |
| PDU Session Type Selection | One single value of PDU Session Type | Optional | Yes | UE context |
| Non-Seamless Offload indication | Indicates if the traffic of the matching application is to be offloaded to non-3GPP access outside of a PDU Session. | Optional | Yes | UE context |
| Access Type preference | Indicates if the traffic of the matching application is to be sent via a ProSe Layer-3 UE-to-Network Relay outside of a PDU session. | Optional | Yes | UE context |
| Route Selection Validation Criteria | | Optional | | |
| Time Window | The time window when the matching traffic is allowed. The RSD is not considered to be valid if the current time is not in the time window. | Optional | Yes | UE context |
| Location Criteria | The UE location where the matching traffic is allowed. The RSD rule is not considered to be valid if the UE location does not match the location criteria. | Optional | Yes | UE context |

If the PDU session establishment request is rejected by the network, the UE may trigger a new PDU session establishment based on the rejection cause and URSP policy. When the PCF provides the UE with URSP rules, One URSP rule with "match all" TD may be included.

A URSP rule with a "match all" TD is used to route traffic for applications that do not match any other URSP rule, and therefore is evaluated as the last URSP rule, i.e. the URSP rule with the lowest priority. There is only one RSD in this URSP rule. The RSD of this URSP rule contains at most one value for each path selection component.

In a URSP, only one URSP rule can be the default URSP rule, and all default URSP rules include matching TDs. If a default URSP rule and one or more non-default URSP rules are included in the URSP, any non-default URSP rule shall have lower precedence value than (i.e. shall be prioritized over) the default URSP rule.

If a traffic descriptor lists one or more application identifiers together with one or more connection capabilities, the UE shall consider that the application identifiers identify the applications requesting access to the connection capabilities.

If one or more DNNs are included in the traffic descriptor of a URSP rule, the route selection descriptor of the URSP rule shall not include any DNN.

The UE may be provided with URSP rules by a PCF of a home public land mobile network (HPLMN). When the UE is roaming, the HPLMN's PCF may update the UE's URSP rules. For URSP rules, the UE supports provisioning from PCF of HPLMN. In addition, the UE may be pre-configured with URSP rules (e.g., by the operator).

If there are both URSP rules provided by the PCF and pre-configured URSP rules, only the URSP rules provided by the PCF are used by the UE. If there is no URSP rule provided by the PCF and the UE has pre-configured URSP rules in both the universal subscriber identification module (USIM) and the mobile equipment (ME), only the URSP rules pre-configured in the USIM are used.

For every newly detected application, the UE evaluates the URSP rules in order of rule priority and determines which URSP rule's TD the application matches.

If a URSP rule is determined to be applicable for a particular application, the UE selects an RSD within this URSP rule in order of RSD priority.

If a valid RSD is found, the UE checks if there is an existing PDU session matching all elements of the selected RSD. The UE compares the components of the selected RSD with the existing PDU session as follows.

For a component which only contains one value (e.g. SSC mode), the value of the PDU Session has to be identical to the value specified in the Route Selection Descriptor.

For a component which contains a list of values (e.g. Network Slice Selection), the value of the PDU Session has to be identical to one of the values specified in the Route Selection Descriptor.

When some component(s) is not present in the Route Selection Descriptor, a PDU Session is considered matching only if it was established without including the missing component(s) in the PDU Session Establishment Request.

When the Route Selection Descriptor includes a Time Window or a Location Criteria, the PDU Session is considered matching only if the PDU Session is associated with an RSD that has the same Time Window or a Location Criteria Validity Conditions.

When a matching PDU Session exists the UE associates the application to the existing PDU Session, i.e. route the traffic of the detected application on this PDU Session.

If none of the existing PDU Sessions matches, the UE tries to establish a new PDU Session using the values specified by the selected Route Selection Descriptor. If the PDU Session Establishment Request is accepted, the UE associates the application to this new PDU Session. If the PDU Session Establishment Request is rejected, based on the rejection cause, the UE selects another combination of values in the currently selected Route Selection Descriptor if any other value for the rejected component in the same Route Selection Description can be used. Otherwise, the UE selects the next Route Selection Descriptor, which contains a combination of component value which is not rejected by network, in the order of the Route Selection Descriptor Precedence, if any. If the UE fails to establish a PDU Session with any of the Route Selection Descriptors, it tries other URSP rules in the order of Rule Precedence with matching Traffic descriptors, except the URSP rule with the "match-all" Traffic descriptor, if any. The UE shall not use the UE Local Configuration in this case.

The UE receives the updated URSP rules and (re-)evaluates their validities in a timely manner when certain conditions are met, for example:

- the URSP is updated by the PCF;
- the UE moves from EPC to 5GC;
- change of Allowed NSSAI or Configured NSSAI;
- change of LADN DNN availability;
- UE registers over 3GPP or non-3GPP access;
- UE establishes connection to a WLAN access.

The Route Selection Descriptor of a URSP rule shall be only considered valid if all of the following conditions are fulfilled:

- If any S-NSSAI(s) is present, the S-NSSAI(s) is in the Allowed NSSAI for the non-roaming case and in the mapping of the Allowed NSSAI to HPLMN S-NSSAI(s) for the roaming case.
- If any DNN is present and the DNN is an LADN DNN, the UE is in the area of availability of this LADN.
- If Access Type preference is present and set to Multi-Access, the UE supports ATSSS.
- If a Time Window is present and the time matches what is indicated in the Time Window.
- If a Location Criteria is present and the UE location matches what is indicated in the Location Criteria.

If a matching URSP rule has no valid RSD, the UE tries other URSP rules in the order of Rule Precedence with matching Traffic descriptors, except the URSP rule with "match-all" Traffic descriptor. The UE shall not use the UE Local Configuration in this case.

When URSP rules are updated or their validity according to the conditions above change, the association of existing applications to PDU Sessions may need to be re-evaluated. The UE may also re-evaluate the application to PDU Session association due to the following reasons:

- periodic re-evaluation based on UE implementation;
- an existing PDU Session that is used for routing traffic of an application based on a URSP rule is released;
- The expiration of Time Window in Route Selection Validation Criteria, i.e. the expiration of Time Window, or
- UE's location no longer matches the Location Criteria.

If the re-evaluation leads to a change of the application to PDU Session association, e.g. the application is to be associated with another PDU Session or a new PDU Session needs to be established, the UE may enforce such changes in a timely manner based on implementation, e.g. immediately or when UE enters CM-IDLE state.

If the selected Route Selection Descriptor contains a Non-Seamless Offload indication and the UE has established a connection to a WLAN access, the UE routes the traffic matching the Traffic descriptor of the URSP rule via the WLAN access outside of a PDU Session.

Table 4 shows an example of a URSP rule.

TABLE 4

| Example URSP rules | | Comments |
| --- | --- | --- |
| Rule Precedence = 1<br>Traffic Descriptor:<br>Application<br>descriptor = App1 | Route Selection Descriptor<br>Precedence = 1<br>Network Slice Selection:<br>S-NSSAI-a<br>SSC Mode Selection: SSC<br>Mode 3<br>DNN Selection: internet<br>Access Type preference:<br>3GPP access | This URSP rule associates the traffic of application "App1" with S-NSSAI-a, SSC Mode 3, 3GPP access and the "internet" DNN.<br>It enforces the following routing policy:<br>The traffic of App1 should be transferred on a PDU Session supporting S-NSSAI-a, SSC Mode 3 and DNN = internet over 3GPP access. If this PDU Session is not established, the UE shall attempt to establish a PDU Session with S-NSSAI-a, SSC Mode 3 and the "internet" DNN over 3GPP access. |
| Rule Precedence = 2<br>Traffic Descriptor:<br>Application<br>descriptor = App2 | Route Selection Descriptor<br>Precedence = 1<br>Network Slice Selection:<br>S-NSSAI-a<br>Access Type preference:<br>Non-3GPP access<br>Route Selection Descriptor<br>Precedence = 2<br>Non-seamless Offload<br>indication: Permitted<br>(WLAN SSID-a) | This URSP rule associates the traffic of application "App2" with S-NSSAI-a and Non-3GPP access.<br>It enforces the following routing policy:<br>The traffic of application App2 should be transferred on a PDU Session supporting S-NSSAI-a using a Non-3GPP access. If this PDU Session is not established, the UE shall attempt to establish a PDU Session with S-NSSAI-a over Access Type = non-3GPP access.<br>If the PDU Session cannot be established, the traffic of App2 shall be directly offloaded to WLAN, if the UE is connected to a WLAN with SSID-a (based on the 2nd RSD) |
| Rule Precedence = 3<br>Traffic Descriptor:<br>DNN = DNN_1 | Route Selection Descriptor<br>Precedence = 1<br>Network Slice Selection:<br>S-NSSAI-a | This URSP rule associates the traffic of applications that are configured to use DNN_1 with DNN_1, S-NSSAI-a over Non-3GPP access. |

TABLE 4-continued

| Example URSP rules | | Comments |
|---|---|---|
| | Access Type preference: Non-3GPP access | It enforces the following routing policy: The traffic of application(s) that are configured to use DNN_1 should be transferred on a PDU Session supporting S-NSSAI-a over Non-3GPP access. If this PDU Session is not established, the UE shall attempt to establish the PDU Session with S-NSSAI-a over Non-3GPP access. |
| Rule Precedence = 4 Traffic Descriptor: Application descriptor = App1 Connection Capabilities = "internet", "supl" | Route Selection Descriptor Precedence = 1 Network Slice Selection: S-NSSAI-a DNN Selection: DNN_1 Access Type preference: Non-3GPP access | This URSP rule associates the application "App1" and the Connection Capabilities "internet" and "supl" with DNN_1, S-NSSAI-a over Non-3GPP access. It enforces the following routing policy: When the "App1" requests a network connection with Connection Capability "internet" or "supl", the UE establishes (if not already established) a PDU Session with DNN_1 and S-NSSAI-a over Non-3GPP access. After that, the UE routes the traffic of "App1" over this PDU Session. |
| Rule Precedence = 5 Traffic Descriptor: Application descriptor = App3 Connection Capabilities = "ims" | Route Selection Descriptor Precedence = 1 Network Slice Selection: S-NSSAI-c DNN Selection: DNN_1 Access Type preference: Multi-Access | This URSP rule associates the application "App3" and the Connection Capability "ims" with DNN_1, S-NSSAI-c and multi-access connectivity. It enforces the following routing policy: When the "App3" requests a network connection with Connection Capability "ims", the UE establishes (if not already established) a MA PDU Session with DNN_1 and S-NSSAI-c. After that, the UE routes the traffic of "App3" over this MA PDU Session by using the received ATSSS rules. |
| Rule Precedence = 6 Traffic Descriptor: Application descriptor = App1 | Route Selection Descriptor Precedence = 1 DNN Selection: DNN_1 Network Slice Selection: S-NSSAI-a Access Type preference: Multi Access | This URSP rule associates App 1 with DNN_1, S-NSSAI-a with Multi Access connectivity. It enforces the following routing policy: The traffic of Application 1 should be transferred on a PDU Session supporting S-NSSAI-a and DNN_1 according to the received ATSSS rules. After that the UE routes the traffic of any other application according to the ATSSS rule with match all packet filters if available. |
| Rule Precedence = lowest priority Traffic Descriptor: * | Route Selection Descriptor Precedence = 1 Network Slice Selection: S-NSSAI-b SSC Mode Selection: SSC Mode 3 DNN Selection: internet | This URSP rule associates all traffic not matching any prior rule a PDU Session with S-NSSAI-b, SSC Mode 3 and the "internet" DNN. It enforces the following routing policy: All traffic not matching any prior rule should be transferred on a PDU Session supporting S-NSSAI-b, SSC Mode 3 and DNN = internet with no access network preference. |

<Problems to be Solved in the Disclosure of the Present Specification>

For redundant transmission, the UE may transmit the PDU session pair ID paired with the PDU session to the SMF. The SMF may then forward this information along with the RSN parameters to the NG-RAN. Based on this information, the NG-RAN may provide separate user plane resources for the two redundant PDU sessions.

In addition, in order to clarify how the UE obtains knowledge of PDU session pair information for a redundant PDU session, when the UE accesses a network (Rel-17) supporting a PDU session pair ID, the PCF may provide a URSP rule including a PDU session pair ID for redundant transmission to the UE.

According to this URSP rule, the UE may start two redundant PDU sessions and may include a PDU session Pair ID so that the network can pair the redundant PDU sessions.

However, the PCF does not know whether the UE supports the PDU session pair ID. If a UE supporting only Rel-16 URLLC accesses a Rel-17 network supporting PDU Session Pair ID, the Rel-16 UE may be configured with a URSP rule including the PDU Session Pair ID. In this case, the UE cannot recognize the PDU Session Pair ID in the URSP rule. If the RSD (Route Selection Descriptor) of the URSP rule includes a component not recognized by the UE, the corresponding RSD must be skipped. Therefore, if the PCF does configure a URSP rule with a PDU session pair ID for redundant transmission to the UE, the UE cannot start two redundant PDU sessions.

<Disclosure of this Specification>

Certain steps in the procedures below may be performed concurrently or in parallel, or may be performed in reversed order.

The following drawings are made to explain a specific example of the present specification. Since the names of specific devices or names of specific signals/messages/fields described in the drawings are provided as examples, the technical features of the present specification are not limited to the specific names used in the drawings below.

1. First Embodiment

The UE may inform the PCF about whether or not to support the PDU session pair ID during a registration procedure. Based on this indication, the PCF may determine whether to establish a URSP including the PDU session pair ID in the UE.

Figure 6:
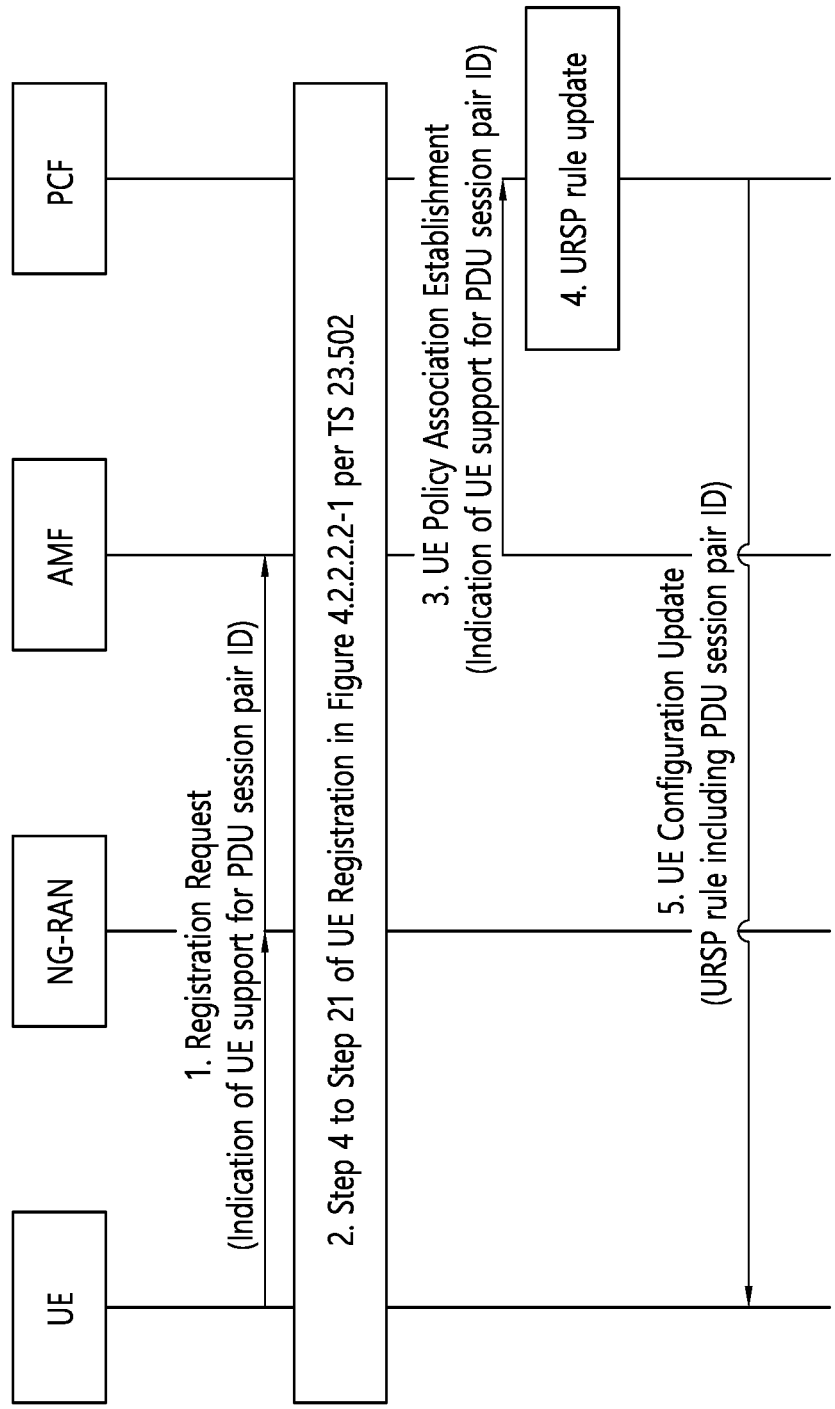
FIG. 6 shows a first example of the first embodiment of the present specification.

FIG. 6 shows a first example of the first embodiment of the present specification.

(1) Step 1: The UE may transmit a Registration Request message to the AMF through the NG-RAN to register in the network.

The UE may initiate a registration procedure by sending a registration request message to the AMF through the NG-RAN to register with the network.

The UE may include an indication of whether the UE supports the PDU session pair ID in the UE policy container IE of the registration request message.

(2) Step 2: Step 21 in step 4 of FIG. 4.2.2.2.2-id of TS 23.502 V17.0.0 may be performed.

(3) Step 3: The AMF may transmit a UE Policy Association Establishment message to the PCF.

The AMF may include an indication of whether the PDU session pair ID is supported by the UE in the UE Policy Association Establishment message and deliver it to the PCF.

(4) Step 4: PCF may update URSP rules.

If an indication of whether the UE supports the PDU session pair ID is included in the UE policy association establishment message, the PCF may determine to configure a URSP rule including the "PDU session pair ID" in the UE. If this indication is not included, the PCF may configure the URSP rule to the UE without the PDU session pair ID.

Note: Alternatively, if an indication of support by the UE is included, the PCF may only configure the RSD to the UE that includes the "PDU Session pair ID" in the URSP rule. If this indication is not included, the PCF may configure the UE with an RSD that does not include the PDU session pair ID in the URSP rule.

(5) Step 5: The PCF may transmit a UE configuration update message to the UE.

The UE configuration update message may include updated URSP rules. The route selection descriptor (RSD) of the URSP rule may include the PDU session pair ID.

The PCF may send updated URSP rules to the UE through a configuration update procedure. According to the URSP rules, the UE may initiate two redundant PDU sessions. If the PDU session pair ID is included in the URSP rule, the UE may include and transmit the PDU session pair ID in the PDU session establishment request message.

Note: Irrespective of the UE support indication for "PDU Session Pair ID", the PCF may determine two types of URSP rule with or without the PDU session pair ID and provide it to the UE. In this case, even if the UE only supporting Rel-16 URLLC accesses to the Rel-17 network supporting the PDU session pair ID, the UE may initiate two redundant PDU sessions based on the URSP rule without PDU session pair ID from the PCF.

Note: Alternatively, irrespective of indication of UE support for "PDU session pair ID", the PCF may also provision the Route Selection Descriptor containing the same components except the PDU Session Pair ID to the UE. In other words, the PCF determines two types of RSDs with or without the PDU session pair ID (i.e. two RSDs for same Traffic descriptor) in the URSP rule and may provide it to the UE. Note that the Route Selection Descriptor with the PDU Session Pair ID has lower precedence value than the one without the PDU Session Pair ID. In this case, even if the UE only supporting Rel-16 URLLC accesses to the Rel-17 network supporting the PDU session pair ID, the UE may initiate two redundant PDU sessions based on the Route Selection Descriptor without PDU session pair ID in the URSP rule from the PCF.

Figure 7:
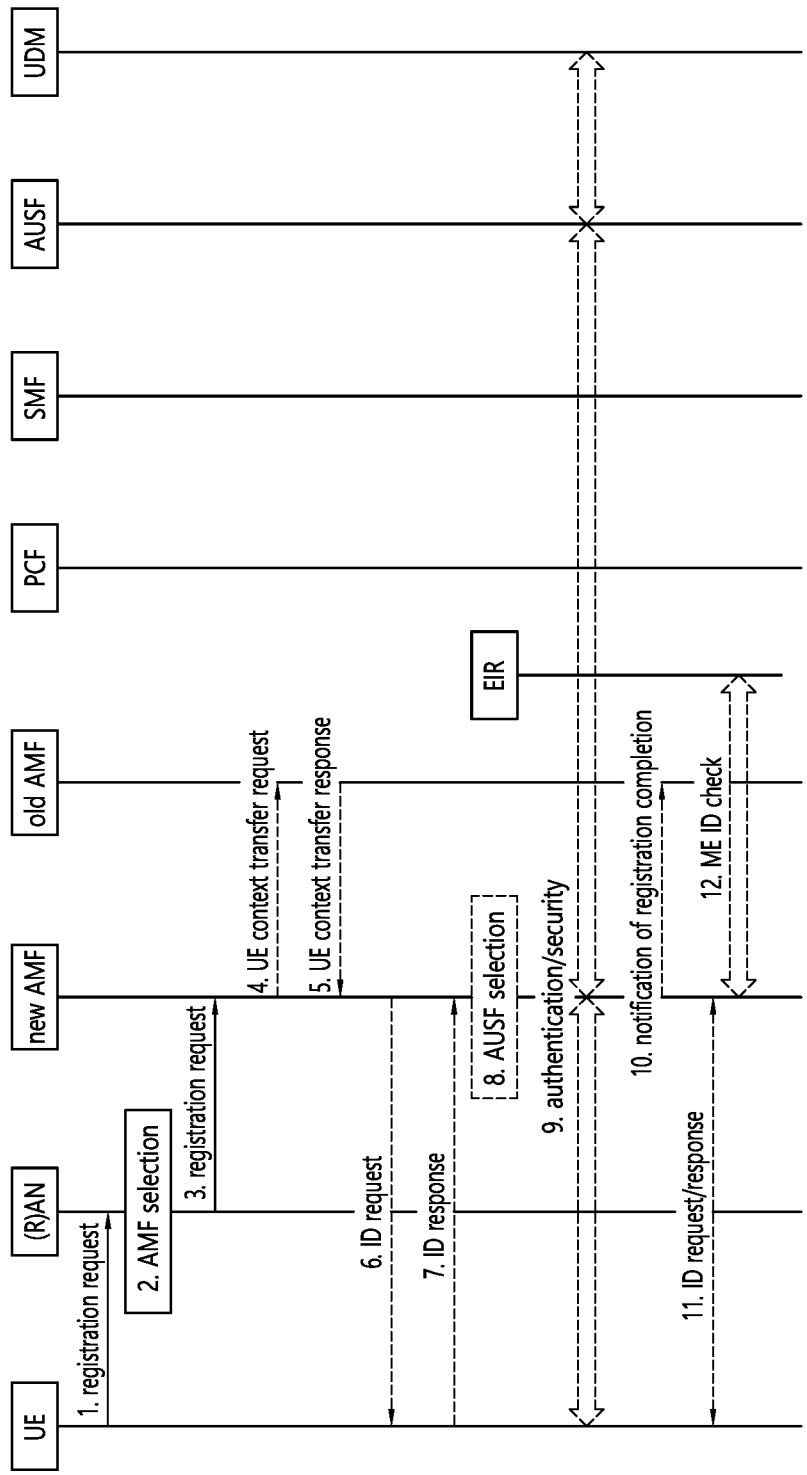
FIG. 7 and FIG. 8 show a second example of the first embodiment of the present specification.
Figure 8:
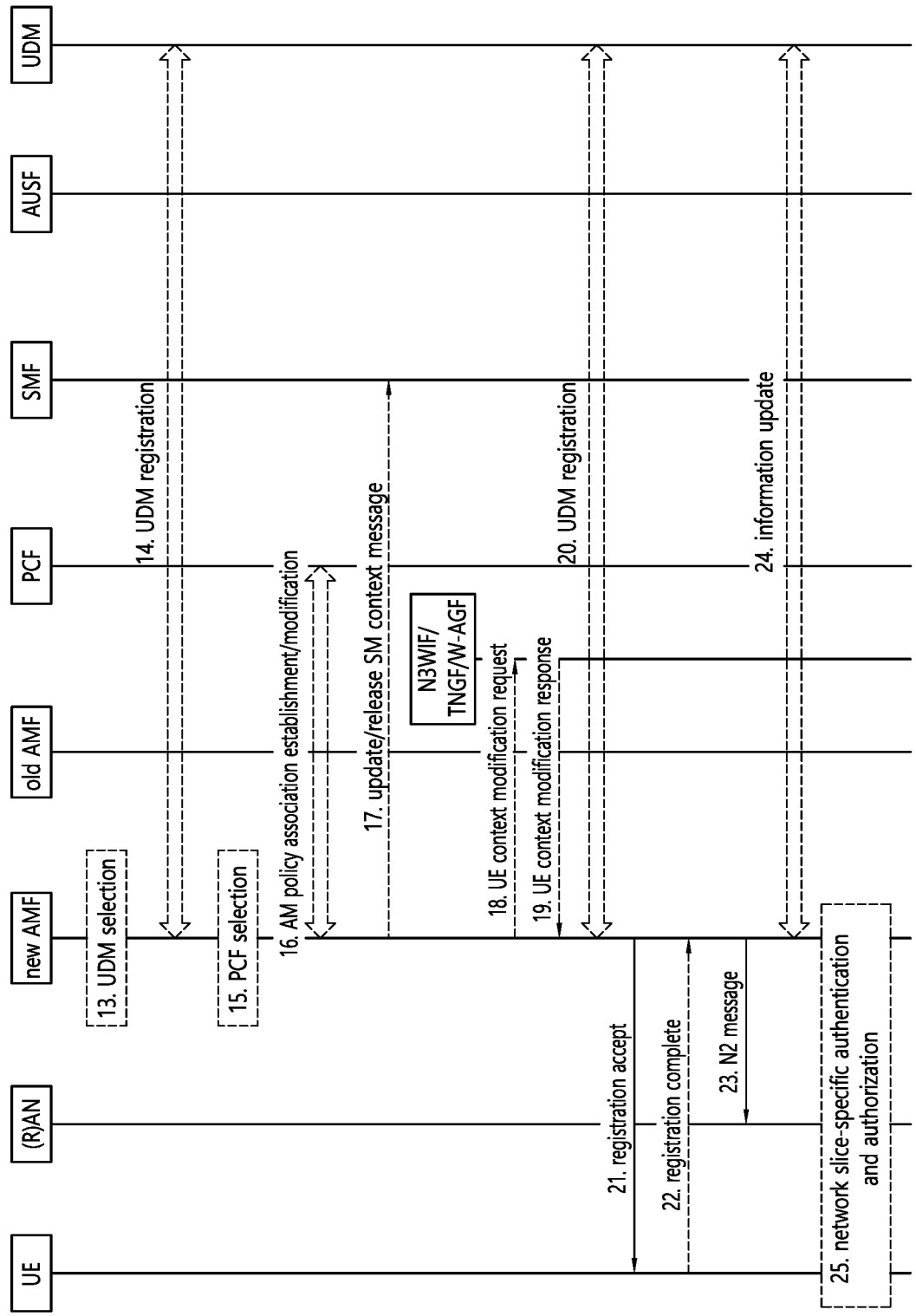
Figure 9:
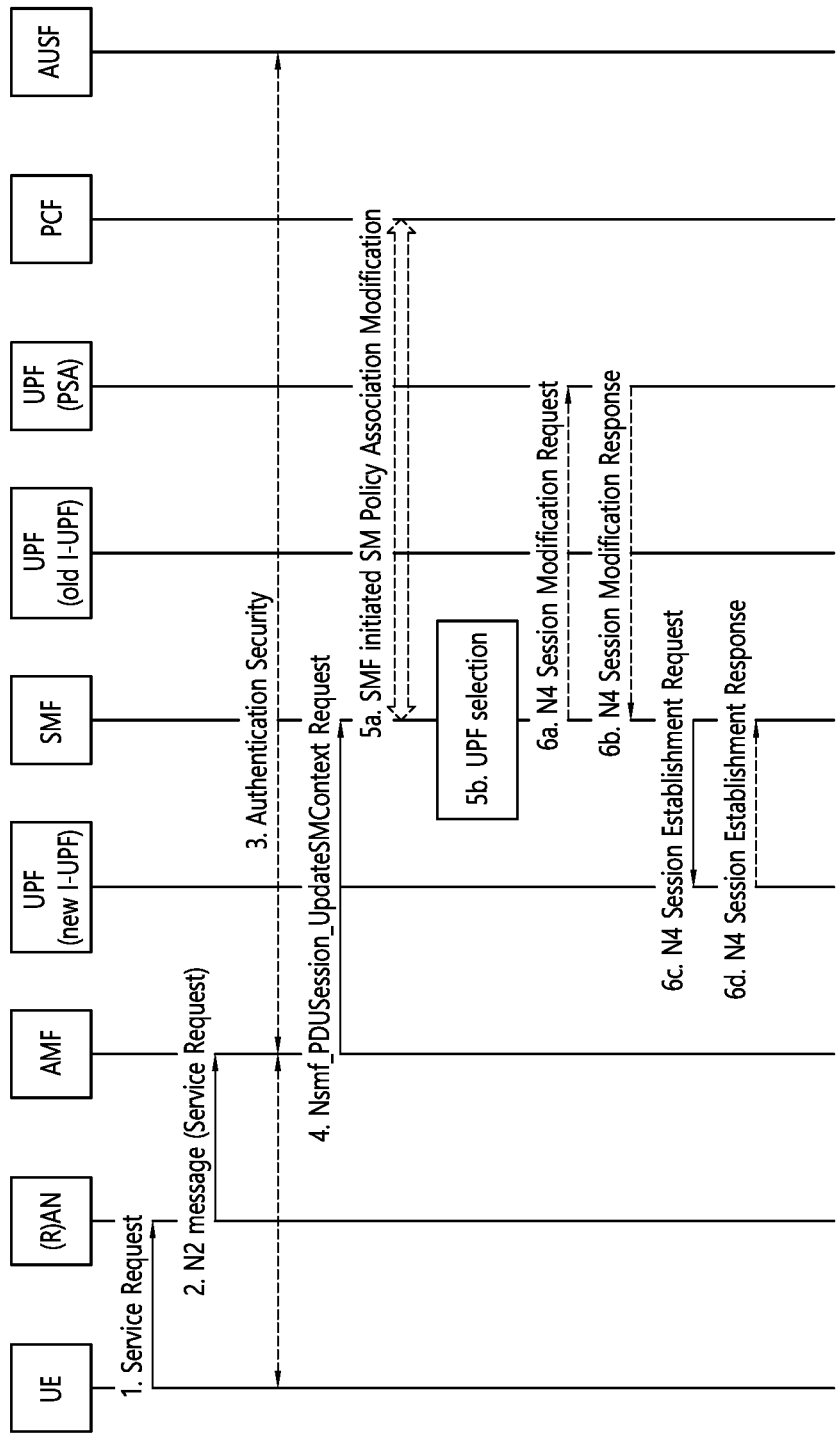
FIGS. 9, 10, 11 and 12 show examples of the third embodiment of the present specification.
Figure 10:
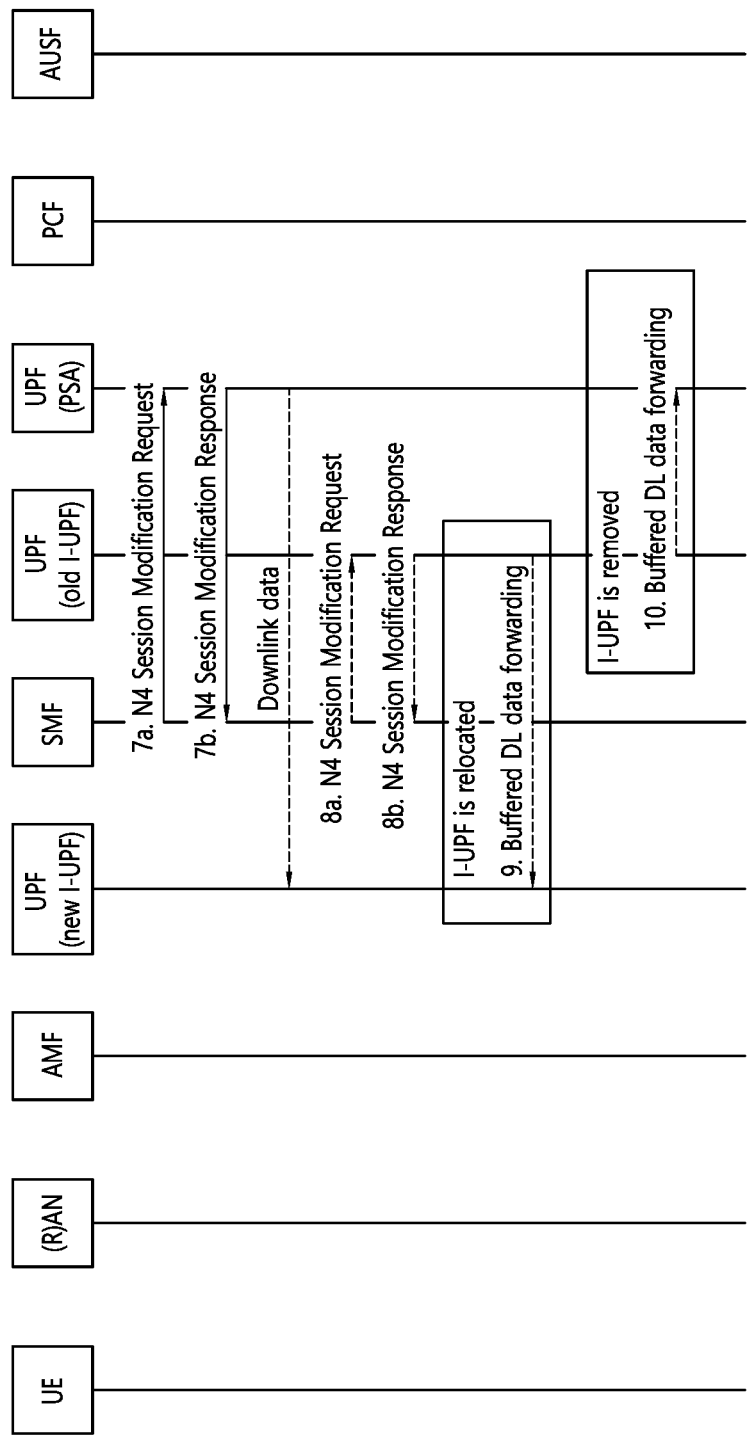
Figure 11:
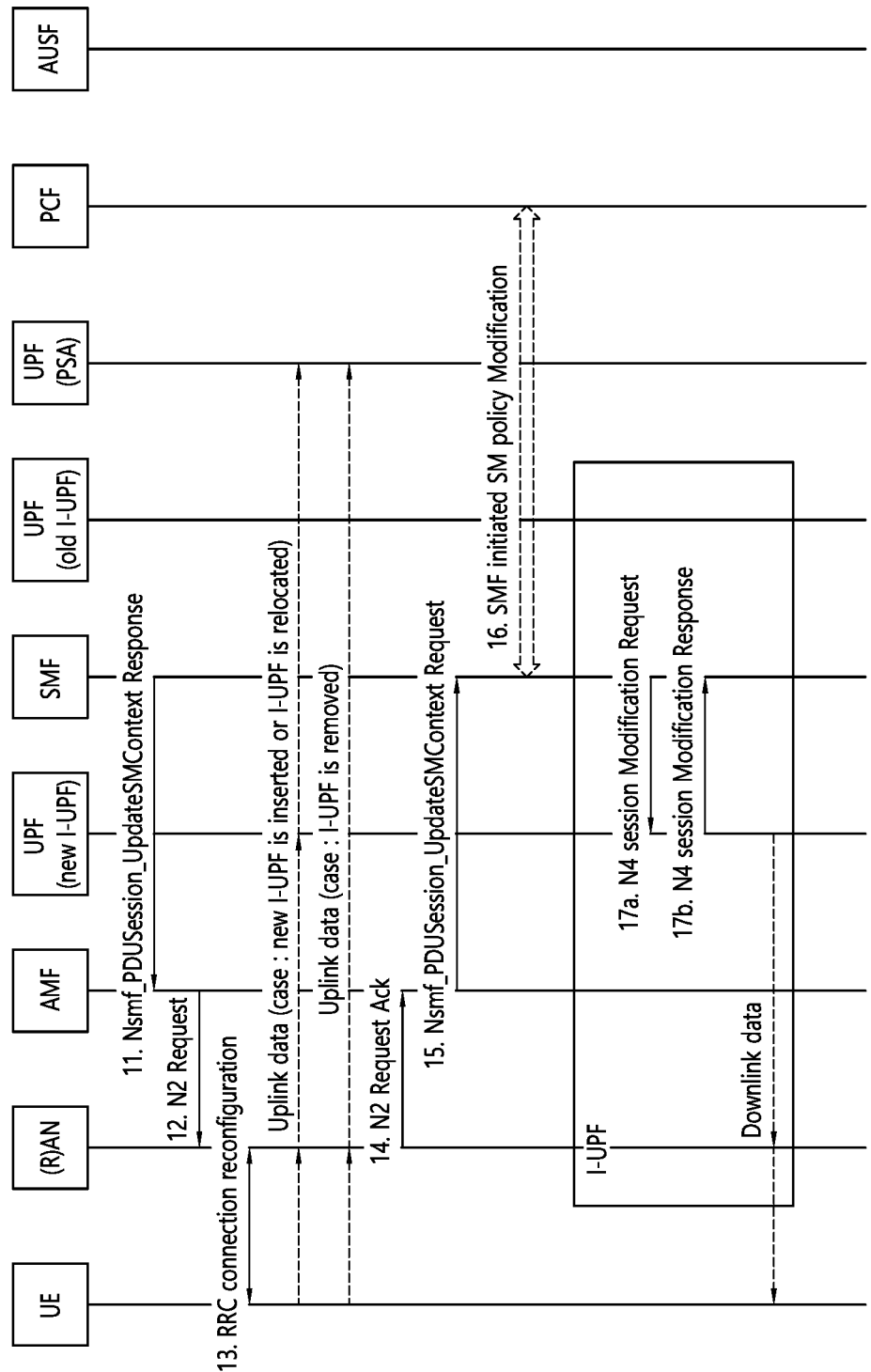
Figure 12:
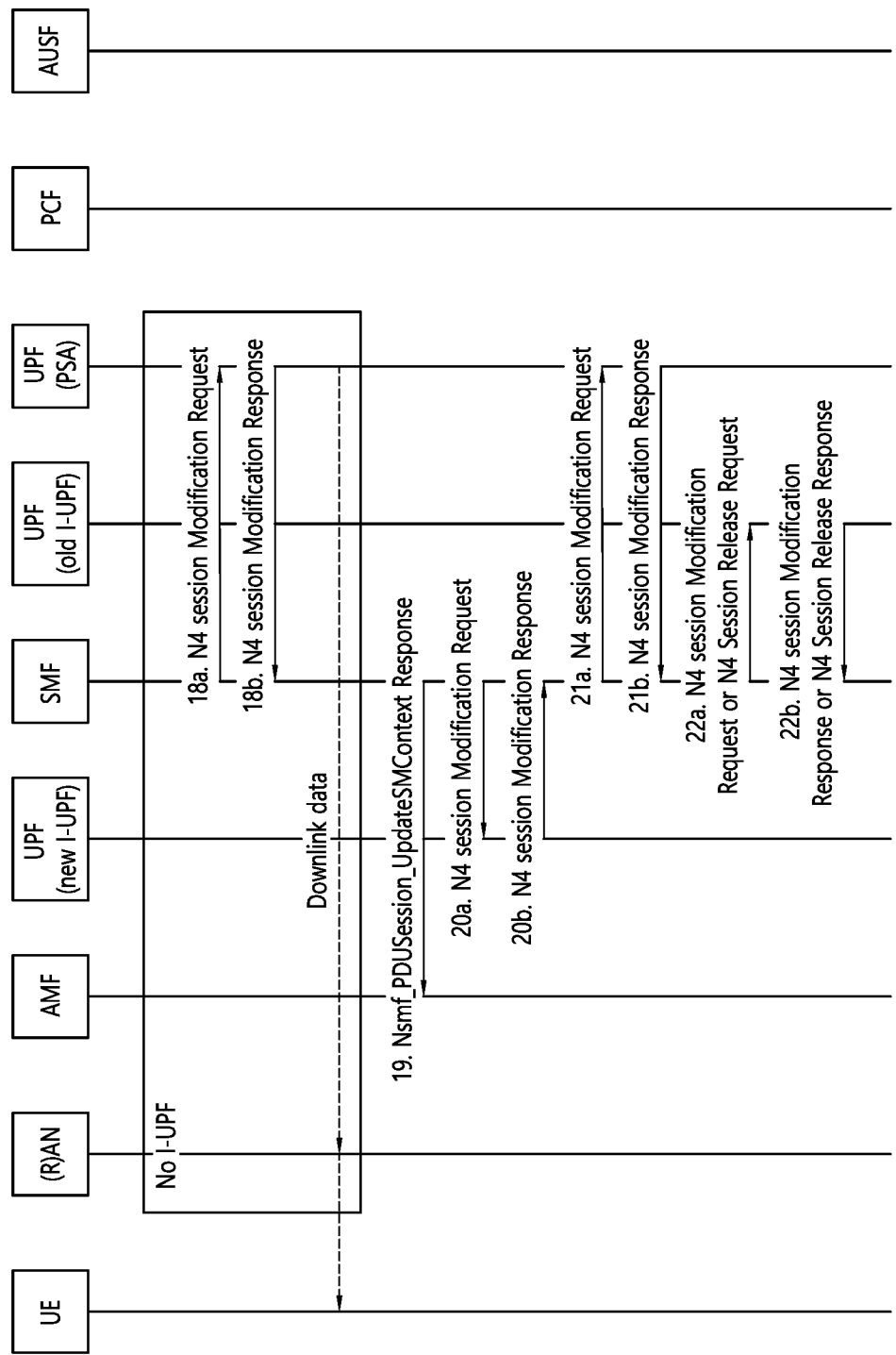

FIG. 7 and FIG. 8 show a second example of the first embodiment of the present specification.

FIGS. 7 and 8 apply the first embodiment of the present specification to the initial registration procedure.

The UE must register with the network to receive services, activate mobility tracking, and activate reachability. The UE initiates the registration procedure using one of the following registration types.

initial registration for 5GS; or
mobility registration update; or
periodic registration update; or
emergency registration The general registration procedures of FIGS. 7 and 8 apply to all the registration procedures described above, but regular registration updates need not include all parameters used in other registration procedures.

The general registration procedure of FIGS. 7 and 8 is also used when a UE registers for a 3GPP connection when the UE is already registered for a non-3GPP connection, and vice versa. AMF change may be required to register for a 3GPP connection when the UE is already registered for a non-3GPP access scenario.

First, the procedure of FIG. 7 will be described.

(1) Step 1: The UE may transmit a Registration Request message to (R) AN. The registration request message may correspond to an AN message.

The registration request message may include an AN parameter. In the case of NG-RAN, the AN parameters may include, for example, 5G-S-TMSI (5G SAE temporary mobile subscriber identity) or GUAMI (globally unique AMF ID), selected PLMN (public land mobile network) ID (or PLMN ID and NID (Network identifier)) and requested NSSAI (network slice selection assistance information). The AN parameter may also include an establishment cause. The establishment cause may include a reason for requesting establishment of an RRC connection. Whether and how the UE includes the requested NSSAI as part of the AN parameters may be dependent on the value of the access stratum connection establishment NSSAI inclusion mode parameter.

The registration request message may include a registration type. The registration type indicates whether the UE wants to perform initial registration (i.e. the UE is in RM-DEREGISTERED state), or whether it wants to perform mobility registration update (i.e. the UE is in RM-REGISTERED state and initiates a Registration procedure due to mobility or due to the UE needs to update its capabilities or protocol parameters, or to request a change of the set of network slices it is allowed to use), or it wants to perform periodic registration updates (i.e., the UE is in RM-REGISTERED state and initiates a Registration procedure due to the Periodic Registration Update timer expiry), or whether it wants to perform emergency registration (i.e., the UE is in limited service state).

When the UE is performing an Initial Registration, the UE may indicate its UE identity in the Registration Request message as follows, listed in decreasing order of preference in the case of registration with a PLMN.

i) a 5G-GUTI mapped from an EPS GUTI, if the UE has a valid EPS GUTI.
ii) a native 5G-GUTI assigned by the PLMN to which the UE is attempting to register, if available;
iii) a native 5G-GUTI assigned by an equivalent PLMN to the PLMN to which the UE is attempting to register, if available;
iv) a native 5G-GUTI assigned by any other PLMN, if available.

This may also be a 5G-GUTIs assigned via another access type.

v) Otherwise, the UE may include its SUCI (subscriber concealed identifier) in the Registration Request.

When the UE performing an Initial Registration has both a valid EPS GUTI and a native 5G-GUTI, the UE may also indicate the native 5G-GUTI as Additional GUTI. If more than one native 5G-GUTIs are available, the UE may select the 5G-GUTI in decreasing order of preference among items (ii)-(iv) in the list above.

When registering with an SNPN with 5G-GUTI as UE identity, the UE may only use the 5G-GUTI previously assigned by the same SNPN.

The NAS message container may be included if the UE is sending a Registration Request message as an Initial NAS message and the UE has a valid 5G NAS security context and the UE needs to send non-cleartext IEs. If the UE does not need to send non-cleartext IEs, the UE may need to send a Registration Request message without including the NAS message container.

If the UE does not have a valid 5G NAS security context, the UE may need to send the Registration Request message without including the NAS message container. The UE may need to include the entire Registration Request message (i.e., containing cleartext IEs and non-cleartext IEs) in the NAS message container that is sent as part of the Security Mode Complete message in step 9b.

When the UE is performing an Initial Registration with a native 5G-GUTI then the UE may indicate the related GUAMI information in the AN parameters. When the UE is performing an Initial Registration with its SUCI, the UE may not indicate any GUAMI information in the AN parameters.

When the UE is performing an Initial Registration or a Mobility Registration and if CIoT 5GS Optimizations are supported, the UE may indicate its Preferred Network Behavior. If S1 mode is supported, the UE's EPC Preferred Network Behavior is included in the S1 UE network capabilities in the Registration Request message.

For an Emergency Registration, the SUCI shall be included if the UE does not have a valid 5G-GUTI available; the PEI may be included when the UE has no SUPI and no valid 5G-GUTI. In other cases, the 5G-GUTI is included and it indicates the last serving AMF.

The UE may provide the UE's usage setting. The UE provides Requested NSSAI, and in the case of Initial Registration or Mobility Registration Update, the UE includes the Mapping Of Requested NSSAI (if available), which is the mapping of each S-NSSAI of the Requested NSSAI to the HPLMN S-NSSAIs, to ensure that the network is able to verify whether the S-NSSAI(s) in the Requested NSSAI are permitted based on the Subscribed S-NSSAIs. In the case of inter PLMN mobility, if the serving PLMN S-NSSAI(s) corresponding to the established PDU Session(s) are not present in the UE, the associated HPLMN S-NSSAI(s) associated with the established PDU Session(s) may be provided in the Mapping Of Requested NSSAI.

The UE includes the Default Configured NSSAI Indication if the UE is using a Default Configured NSSAI.

The UE may include UE paging probability information if it supports the assignment of WUS Assistance Information from the AMF.

In the case of Mobility Registration Update, the UE includes in the List Of PDU Sessions To Be Activated the PDU Sessions for which there are pending uplink data. When the UE includes the List Of PDU Sessions To Be Activated, the UE may indicate PDU Sessions only associated with the access the Registration Request is related to. The UE may include always-on PDU Sessions which are accepted by the network in the List Of PDU Sessions To Be Activated even if there are no pending uplink data for those PDU Sessions.

NOTE 3: A PDU Session corresponding to a LADN is not included in the List Of PDU Sessions To Be Activated when the UE is outside the area of availability of the LADN.

The UE MM Core Network Capability may be provided by the UE and handled by AMF. The UE may include in the UE MM Core Network Capability an indication if it supports Request Type flag "handover" for PDN connectivity request during the attach procedure. If the UE supports 'Strictly Periodic Registration Timer Indication', the UE may indicate its capability of 'Strictly Periodic Registration Timer Indication' in the UE MM Core Network Capability. If the UE supports CAG, the UE may indicate its capability of "CAG supported" in the UE MM Core Network Capability.

The UE may provide either the LADN DNN(s) or an Indication Of Requesting LADN Information.

If available, the last visited TAI may be included in order to help the AMF produce Registration Area for the UE.

The registration request message may also include a Security parameters and PDU session status, etc. The Security parameters are used for Authentication and integrity protection. The PDU Session status indicates the previously established PDU Sessions in the UE. When the UE is connected to the two AMFs belonging to different PLMN via 3GPP access and non-3GPP access, then the PDU Session status may indicate the established PDU Session of the current PLMN in the UE.

The Follow-on request may be included when the UE has pending uplink signaling and the UE doesn't include List Of PDU Sessions To Be Activated, or the Registration type indicates the UE wants to perform an Emergency Registration. In Initial Registration and Mobility Registration Update, UE may provide the UE Requested DRX parameters. The UE may provide the extended idle mode DRX parameters to request extended idle mode DRX.

The UE may provide UE Radio Capability Update indication.

The UE may include the MICO mode preference and optionally a Requested Active Time value if the UE wants to use MICO Mode with Active Time.

The UE may indicate its Service Gap Control Capability in the UE MM Core Network Capability.

For a UE with a running Service Gap timer in the UE, the UE may not set Follow-on Request indication or Uplink data status in the Registration Request message, except for network access for regulatory prioritized services like Emergency services or exception reporting.

If UE supports RACS and has been assigned UE Radio Capability ID(s), the UE may indicate a UE Radio Capability ID as non-cleartext IE.

The PEI may be retrieved in initial registration from the UE.

The registration request message may include an indication of whether the UE supports the PDU session pair ID.

(2) Step 2: (R)AN may select AMF.

If a 5G-S-TMSI or GUAMI is not included or the 5G-S-TMSI or GUAMI does not indicate a valid AMF, the (R)AN, based on (R)AT and requested NSSAI, if available, may select an AMF.

If UE is in CM-CONNECTED state, the (R)AN can forward the Registration Request message to the AMF based on the N2 connection of the UE.

If the (R)AN cannot select an appropriate AMF, it forwards the Registration Request message to an AMF which has been configured, in the (R)AN, to perform AMF selection.

(3) Step 3: The (R)AN transmits a Registration Request message to the new AMF. The Registration Request message corresponds to N2 message.

The Registration Request message may include whole information and/or a part of information included in the Registration Request message received from the UE which is described in step 1.

The Registration Request message may include N2 parameters. When NG-RAN is used, the N2 parameters include the selected PLMN ID (or PLMN ID and NID), location information and cell identity related to the cell in which the UE is camping, UE context request which indicates that a UE context including security information needs to be setup at the NG-RAN. When NG-RAN is used, the N2 parameters shall also include the establishment cause.

If the Registration type indicated by the UE is Periodic Registration Update, then steps 4 to 19 may be omitted.

(4) Step 4: If the UE's 5G-GUTI was included in the Registration Request message and the serving AMF has changed since last registration procedure, the new AMF may invoke the Namf_Communication_UEContextTransfer service operation on the old AMF including the complete registration request non-access stratum (NAS) message to request the UE's SUPI and UE context.

(5) Step 5: The Old AMF may respond to the new AMF for the Namf_Communication_UEContextTransfer invocation by including the UE's SUPI and UE context.

(6) Step 6: If the SUCI is not provided by the UE nor retrieved from the old AMF, the identity request procedure may be initiated by the new AMF sending the Identity Request message to the UE requesting the SUCI.

(7) Step 7: The UE may respond with an Identity Response message including the SUCI. The UE derives the SUCI by using the provisioned public key of the home PLMN (HPLMN).

(8) Step 8: The new AMF may decide to initiate UE authentication by invoking an AUSF. In that case, the new AMF selects an AUSF based on SUPI or SUCI.

(9) Step 9: Authentication/security may be established by the UE, new AMF, AUSF and/or UDM.

(10) Step 10: If the AMF has changed, the new AMF may notify the old AMF that the registration of the UE in the new AMF is completed by invoking the Namf_Communication_RegistrationCompleteNotify service operation. If the authentication/security procedure fails, then the registration shall be rejected, and the new AMF may invoke the Namf_Communication_RegistrationCompleteNotify service operation with a reject indication reason code towards the old AMF. The old AMF may continue as if the UE context transfer service operation was never received.

(11) Step 11: If the PEI was not provided by the UE nor retrieved from the old AMF, the Identity Request procedure may be initiated by the new AMF sending an Identity Request message to the UE to retrieve the PEI. The PEI shall be transferred encrypted unless the UE performs emergency registration and cannot be authenticated.

(12) Step 12: Optionally, the new AMF may initiate ME identity check by invoking the N5g-eir_EquipmentIdentityCheck_Get service operation.

Now, procedures of FIG. 7, which follow the procedures of FIG. 6, are described.

(13) Step 13: If step 14 below is to be performed, the new AMF, based on the SUPI, may select a UDM, then UDM may select a UDR instance.

(14) Step 14: The new AMF may register with the UDM.

(15) Step 15: The new AMF may select a PCF.

(16) Step 16: The new AMF may optionally perform an AM Policy Association Establishment/Modification.

(17) Step 17: The new AMF may transmit Update/Release SM Context message (e.g., Nsmf_PDUSession_UpdateSMContext and/or Nsmf_PDUSession_ReleaseSMContext) to the SMF.

(18) Step 18: If the new AMF and the old AMF are in the same PLMN, the new AMF may send a UE Context Modification Request to the N3IWF/TNGF/W-AGF.

(19) Step 19: The N3IWF/TNGF/W-AGF may send a UE Context Modification Response to the new AMF.

(20) Step 20: After the new AMF receives the response message from the N3IWF/TNGF/W-AGF in step 19, the new AMF may register with the UDM.

(21) Step 21: The new AMF transmits a Registration Accept message to the UE.

The new AMF sends a Registration Accept message to the UE indicating that the Registration Request has been accepted. 5G-GUTI is included if the new AMF allocates a new 5G-GUTI. If the UE is already in RM-REGISTERED state via another access in the same PLMN, the UE shall use the 5G-GUTI received in the Registration Accept message for both registrations. If no 5G-GUTI is included in the Registration Accept message, then the UE uses the 5G-GUTI assigned for the existing registration also for the new registration. If the new AMF allocates a new registration area, it shall send the registration area to the UE via Registration Accept message. If there is no registration area included in the Registration Accept message, the UE shall consider the old registration area as valid. Mobility Restrictions is included in case mobility restrictions applies for the UE and registration type is not emergency registration. The new AMF indicates the established PDU sessions to the UE in the PDU Session status. The UE removes locally any internal resources related to PDU sessions that are not marked as established in the received PDU Session status. When the UE is connected to the two AMFs belonging to different PLMN via 3GPP access and non-3GPP access then the UE removes locally any internal resources related to the PDU session of the current PLMN that are not marked as established in received PDU Session status. If the PDU Session status information was in the Registration Request message, the new AMF shall indicate the PDU Session status to the UE.

The Allowed NSSAI provided in the Registration Accept message is valid in the registration area and it applies for all the PLMNs which have their tracking areas included in the registration area. The Mapping Of Allowed NSSAI is the mapping of each S-NSSAI of the Allowed NSSAI to the HPLMN S-NSSAIs. The Mapping Of Configured NSSAI is the mapping of each S-NSSAI of the Configured NSSAI for the serving PLMN to the HPLMN S-NSSAIs.

Furthermore, optionally the new AMF performs a UE Policy Association Establishment.

(22) Step 22: The UE may send a Registration Complete message to the new AMF when it has successfully updated itself.

The UE may send a Registration Complete message to the new AMF to acknowledge if a new 5G-GUTI was assigned.

(23) Step 23: For registration over 3GPP Access, if the new AMF does not release the signaling connection, the new AMF may send the RRC Inactive Assistance Information to the NG-RAN. For registration over non-3GPP Access, if the UE is also in CM-CONNECTED state on 3GPP access, the new AMF may send the RRC Inactive Assistance Information to the NG-RAN.

(24) Step 24: The new AMF may perform information update towards the UDM.

(25) Step 25: The UE may execute Network Slice-Specific Authentication and Authorization procedure.

2. Second Embodiment

Regardless of whether the UE transmits an indication of whether or not the UE supports the PDU session pair ID, the PCF may create two URSP rules with and without the PDU session pair ID and may provide them to the UE. In this case, even if a UE that supports only Rel-16 URLLC (a UE that does not support PDU session pair ID) accesses a Rel-17 network that supports PDU session pair ID, the UE may initiate two redundant PDU sessions based on the URSP rule without a PDU session pair ID from the PCF.

The PCF may provide the UE with an RSD including the same components except for the PDU session Pair ID. PCF may create a URSP rule containing two RSDs for the same traffic descriptor. One of the two RSDs may be an RSD with a PDU session pair ID, and the other RSD may be an RSD without a PDU session pair ID. The PCF may set priorities so that an RSD with a PDU session pair ID is selected prior to an RSD without a PDU session pair ID. The URSP rule determined in this way may be transmitted to the UE. Depending on the type of UE, two redundant PDU sessions may be created as follows.

In case of UEs that do not support PDU session pair ID
The UE checks the RSD including the PDU session pair ID with higher priority first, but since the UE cannot recognize the PDU session pair ID, the UE may skip the corresponding RSD. Then, the UE checks an RSD that does not include a PDU session Pair ID having a lower priority, and thus may create two redundant PDU sessions based on the RSD (that does not include a PDU session Pair ID).

In case of UE supporting PDU Session Pair ID
The UE checks the RSD including the PDU session Pair ID with a higher priority first, and since the UE can recognize the PDU session Pair ID, the UE may create two redundant PDU sessions based on the corresponding RSD.

3. Third Embodiment

FIGS. 9,10, 11 and 12 show examples of the third embodiment of the present specification.

A UE in the CM IDLE state may initiate a service request procedure by transmitting an uplink signaling message or user data, by requesting an emergency service fallback, or by transmitting response to a network paging request.

(1) Step 1: The UE may transmit a service request message to (R)AN.

(2) Step 2: (R)AN may transmit N2 message to AMF.
The N2 message may include a service request.

(3) Step 3: A security authentication procedure may be performed.

(4) Step 4: AMF may transmit Nsmf_PDUSession_UpdateSMContext Request to SMF.

(5a) Step 5a: The SMF may initiate SM Policy Association Modification.

(5b) Step 5b: SMF may select UPF.

(6a) Step 6a: The SMF may transmit an N4 Session Modification Request message to the UPF (PSA).

(6b) Step 6b: The UPF (PSA) may transmit an N4 Session Modification Response message to the SMF.

(6c) Step 6c: The SMF may transmit an N4 Session Establishment Request message to the UPF (intermediate).

(6d) Step 6d: The UPF (intermediate) may transmit an N4 Session Establishment Response message to the SMF.

(7a) Step 7a: The SMF may transmit an N4 Session Modification Request message to the UPF (PSA).

(7b) Step 7b: The UPF (PSA) may transmit an N4 Session Modification Response message to the SMF.

(8a) Step 8a: The SMF may transmit an N4 Session Modification Request message to the UPF (intermediate).

(8b) Step 8b: The UPF (intermediate) may transmit an N4 Session Modification Response message to the SMF.

(9) Step 9: The old UPF (intermediate) may transmit buffered downlink data forwarding to the new UPF (intermediate).

(10) Step 10: The old UPF (intermediate) may transmit buffered downlink data forwarding to the UPF (PSA).

(11) Step 11: SMF may transmit Nsmf_PDUSession_UpdateSMContext Response to AMF.

Nsmf_PDUSession_UpdateSMContext Response may include N2 SM information, N1 SM Container, and Cause. N2 SM information may include a PDU session Pair ID (identifier).

RSN and PDU Session Pair ID may be included if applicable as determined by SMF during PDU Session Establishment.

(12) Step 12: AMF may transmit N2 Request to (R)AN.

(13) Step 13: The NG-RAN may perform RRC Connection Reconfiguration together with the UE according to QoS information.

If the NG-RAN cannot establish a redundant user plane for the PDU session as indicated by the RSN and PDU session Pair ID, the NG-RAN may make a decision on how to proceed with the PDU session.

(14) Step 14: (R)AN may transmit N2 Request Ack to AMF.

(15) Step 15: AMF may transmit Nsmf_PDUSession_UpdateSMContext Request to SMF.

(16) Step 16: If dynamic PCC is deployed, SMF may initiate notification about new location information for PCF (if subscribed) by performing an SMF initiated SM Policy Modification procedure. The PCF may provide updated policies.

(17a) Step 17a: The SMF may transmit an N4 Session Modification Request to the new intermediate UPF.

(17b) Step 17b: The UPF may transmit an N4 Session Modification Response to the SMF.

(18a) Step 18a: The SMF may transmit an N4 Session Modification Request to the UPF (PSA).

(18b) Step 18b: The UPF may transmit an N4 Session Modification Response to the SMF.

(19) Step 19: SMF may transmit Nsmf_PDUSession_UpdateSMContext Response to AMF.

(20a) Step 20a: The SMF may transmit an N4 Session Modification Request to the new UPF (intermediate).

(20b) Step 20b: The new UPF (intermediate) may transmit an N4 session modification response to the SMF.

(21a) Step 21a: The SMF may transmit an N4 Session Modification Request to the UPF (PSA).

(21b) Step 21b: The UPF (PSA) may transmit an N4 Session Modification Response to the SMF.

(22a) Step 22a: The SMF may transmit an N4 Session Modification Request or N4 Session Release Request to the old UPF.

(22b) Step 22b: Old intermediate UPF may transmit N4 Session Modification Response or N4 Session Release Response to SMF.

4. Fourth Embodiment

Figure 13:
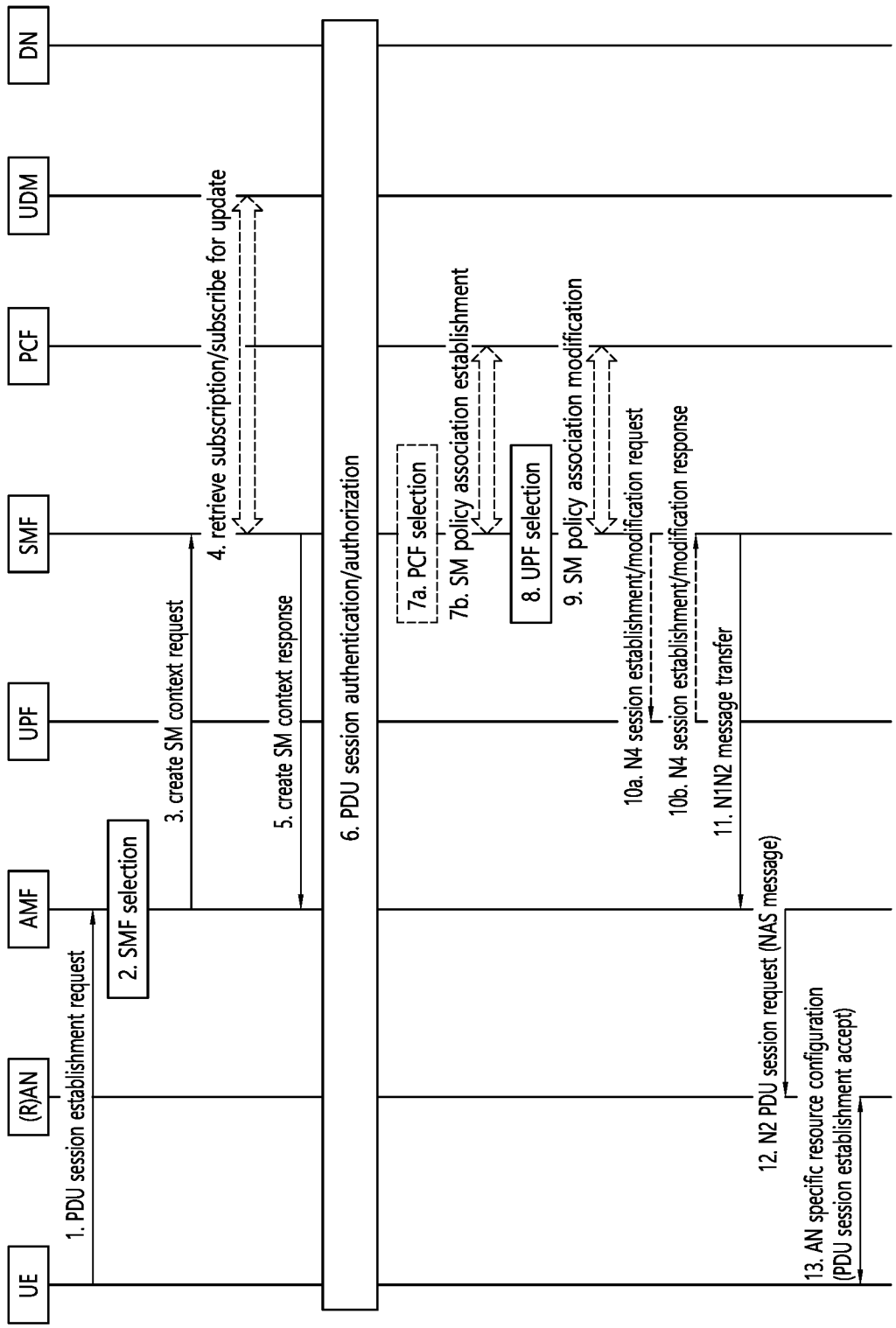
FIGS. 13 and 14 show examples of the fourth embodiment of the present specification.
Figure 14:
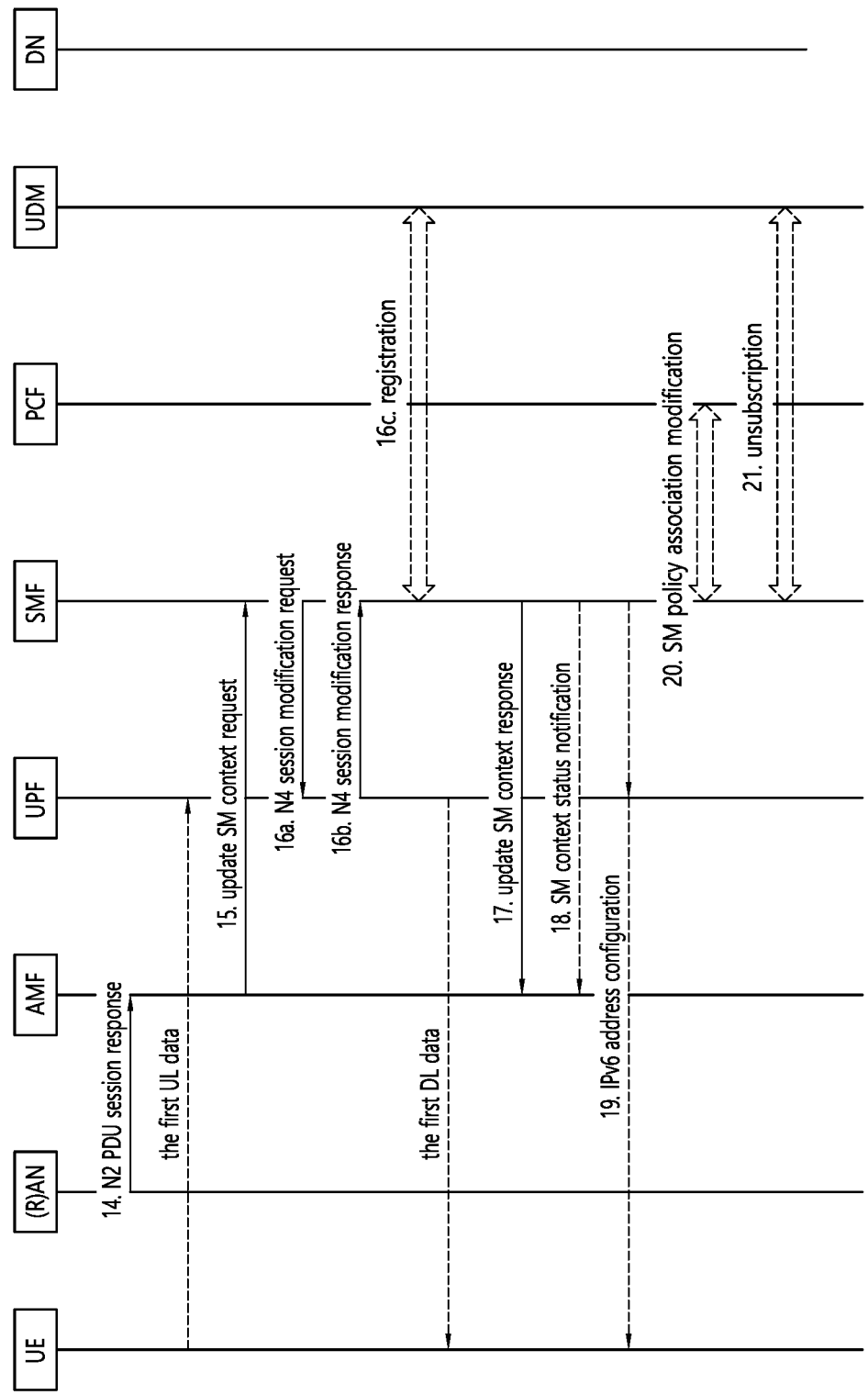

FIGS. 13 and 14 show examples of the fourth embodiment of the present specification.

PDU session establishment may correspond to:
UE-initiated PDU session establishment procedure
PDU session handover between 3GPP and non-3GPP initiated by the UE
PDU session handover from UE-initiated EPS to 5GS.
Network-triggered PDU session establishment procedure A PDU session may either (a) be associated with a single connection type at any given time, i.e. a 3GPP connection or a non-3GPP connection, or (b) be associated with multiple connection types simultaneously, i.e. one 3GPP connection and one non-3GPP connection. A PDU session associated with multiple access types is referred to as a multi access (MA) PDU session and may be requested by a UE supporting ATSSS (access traffic steering, switching, splitting).

FIGS. 13 and 14 specify a procedure for establishing a PDU session associated with a single connection type at a given time.

In the procedures shown in FIGS. 13 and 14, since the UE has already been registered with the AMF, it is assumed that the AMF has already retrieved user subscription data from the UDM unless the UE is urgently registered.

First, the procedure of FIG. 13 will be described.

(1) Step 1: To establish a new PDU session, the UE generates a new PDU session ID.

The UE initiates the UE Requested PDU Session Establishment procedure by the transmission of a NAS message containing a PDU Session Establishment Request within the N1 SM container. The PDU Session Establishment Request may include a PDU session ID, Requested PDU Session Type, a Requested SSC mode, 5GSM Capability, PCO, SM PDU DN Request Container, [Number Of Packet Filters], [Header Compression Configuration], UE Integrity Protection Maximum Data Rate, [Always-on PDU Session Requested], and PDU Session pair identifier.

The Request Type indicates "Initial request" if the PDU Session Establishment is a request to establish a new PDU Session and indicates "Existing PDU Session" if the request refers to an existing PDU Session switching between 3GPP access and non-3GPP access or to a PDU Session handover from an existing PDN connection in EPC. If PDU session establishment is request for establishing PDU session for Emergency service, Request Type indicates "Emergency Request". If the request refers to an existing PDU session for emergency services switched between a 3GPP connection and a non-3GPP connection, or a PDU session handover from an existing PDN connection for emergency services in the EPC, the request type indicates "Existing Emergency PDU Session".

The UE includes the S-NSSAI from the allowed NSSAI of the current connection type. If the Mapping Of Allowed NSSAI is provided to the UE, the UE provides both the S-NSSAI of the visited VPLMN (VPLMN) from the allowed NSSAI and the corresponding S-NSSAI of the HPLMN from the mapping of the allowed NSSAI.

When the UE establishes a PDU session for redundant transmission and the UE is configured to include the PDU session pair ID by the PCF, the UE may include the PDU session pair ID in the PDU session establishment request message.

(2) Step 2: AMF selects SMF. If the request type indicates "initial request", or if the request is due to a handover from a non-3GPP connection provided by EPS or another AMF, the AMF stores not only the connection type of the PDU session, but also the association of S-NSSAI(s), DNN (data network name), PDU session ID, and SMF ID If the Request Type is "initial request" and if the Old PDU Session ID indicating the existing PDU Session is also contained in the message, the AMF selects an SMF and stores an association of the new PDU Session ID, the S-NSSAI(s), the selected SMF ID as well as Access Type of the PDU Session.

If the Request Type indicates "Existing PDU Session", the AMF selects the SMF based on SMF-ID received from UDM. The AMF updates the Access Type stored for the PDU Session.

If the Request Type indicates "Existing PDU Session" referring to an existing PDU Session moved between 3GPP access and non-3GPP access, then if the Serving PLMN S-NSSAI of the PDU Session is present in the Allowed NSSAI of the target access type, the PDU Session Establishment procedure can be performed in the following cases:
the SMF ID corresponding to the PDU Session ID and the AMF belong to the same PLMN;
the SMF ID corresponding to the PDU Session ID belongs to the HPLMN;
Otherwise the AMF shall reject the PDU Session Establishment Request with an appropriate reject cause.

The AMF shall reject a request coming from an Emergency Registered UE and the Request Type indicates neither "Emergency Request" nor "Existing Emergency PDU Session"

(3) Step 3: If AMF is not associated with SMF for the PDU Session ID provided by the UE (e.g. when the request type indicates "Initial Request"), AMF invoke the create SM context request procedure (e.g. Nsmf_PDUSession_CreateSMContext Request). If AMF has already associated with the SMF for the PDU Session ID provided by the UE (e.g. when the request type indicates "existing PDU Session"), AMF invokes the update SM context request procedure (e.g. Nsmf_PDUSession_UpdateSMContext Request).

The AMF sends the S-NSSAI of the Serving PLMN from the Allowed NSSAI to the SMF. For roaming scenario in local breakout (LBO), the AMF also sends the corresponding S-NSSAI of the HPLMN from the Mapping Of Allowed NSSAI to the SMF.

The AMF ID is the UE's GUAMI which uniquely identifies the AMF serving the UE. The AMF forwards the PDU Session ID together with the N1 SM container containing the PDU Session Establishment Request received from the UE. The GPSI shall be included if available at AMF.

The AMF provides the PEI instead of the SUPI when the UE in limited service state has registered for Emergency services (i.e. Emergency Registered) without providing a SUPI. If the UE in limited service state has registered for Emergency services (i.e. Emergency Registered) with a SUPI but has not been authenticated, the AMF indicates that the SUPI has not been authenticated. The SMF determines that the UE has not been authenticated when it does not receive a SUPI for the UE or when the AMF indicates that the SUPI has not been authenticated.

AMF may include the PCF ID in Nsmf_PDUSession_CreateSMContext. This PCF ID identifies the H-PCF (home PCF) in the non-roaming case and the V-PCF (visited PCF) in the LBO roaming case.

(4) Step 4: If Session Management Subscription data for corresponding SUPI, DNN and S-NSSAI of the HPLMN is not available, SMF may retrieve session management subscription data from UDM, and this subscription, and SMF may be notified when the session management subscription data is modified.

(5) Step 5: The SMF transmits a create SM context response message (eg, Nsmf_PDUSession_CreateSMContext Response) or an update SM context response message (eg, Nsmf_PDUSession_UpdateSMContext Response) to the AMF according to the request received in step 3.

If the SMF receives the Nsmf_PDUSession_CreateSMContext Request in step 3 and is able to process the PDU session establishment request, the SMF creates the SM context and responds to the AMF by providing the SM context ID.

When the SMF decides to not accept to establish a PDU Session, the SMF rejects the UE request via NAS SM signaling including a relevant SM rejection cause by responding to the AMF with Nsmf_PDUSession_CreateSMContext Response. The SMF also indicates to the AMF that the PDU Session ID is to be considered as released, the SMF proceeds to step 20 and the PDU Session Establishment procedure is stopped.

(6) Step 6: Optional secondary authentication/authorization may be performed.

(7a) Step 7a: If dynamic PCC (policy and charging control) is to be used for the PDU Session, the SMF performs PCF selection.

(7b) Step 7b: The SMF may perform an SM Policy Association Establishment procedure to establish an SM Policy Association with the PCF and get the default PCC Rules for the PDU Session.

(8) Step 8: The SMF selects one or more UPFs.

(9) Step 9: The SMF may provide information on the policy control request trigger condition satisfied by performing the SM policy association modification procedure initiated by the SMF.

(10) Step 10: If the request type indicates "initial request", the SMF may initiate an N4 Session Establishment procedure with the selected UPF. Otherwise, the SMF may initiate an N4 Session Modification procedure with the selected UPF.

In step 10a, the SMF may send an N4 session establishment/modification request to the UPF, and provides packet detection, enforcement and reporting rules to be installed in the UPF for the PDU session. In step 10b, the UPF may acknowledge by transmitting an N4 session establishment/modification response.

(11) Step 11: The SMF transmits a N1N2MessageTransfer message (e.g., Namf_Communication_N1N2 Message Transfer) to the AMF.

The N1N2MessageTransfer message may include the PDU session pair ID.

The N1N2MessageTransfer message may include N2 SM information. The N2 SM information carries information that the AMF shall forward to the (R)AN which includes:

The CN Tunnel Info corresponds to the Core Network address(es) of the N3 tunnel corresponding to the PDU Session;
One or multiple QoS profiles and the corresponding QFIs;
PDU Session ID: indicates to the UE the association between (R)AN resources and a PDU Session for the UE;
the S-NSSAI with the value for the Serving PLMN (i.e. the HPLMN S-NSSAI or, in LBO roaming case, the VPLMN S-NSSAI);
User Plane Security Enforcement information is determined by the SMF;
If the User Plane Security Enforcement information indicates that Integrity Protection is "Preferred" or "Required", the SMF also includes the UE Integrity Protection Maximum Data Rate.
RSN (redundancy sequence number) parameter and PDU session Pair ID A N1N2MessageTransfer message may contain an N1 SM container. The N1 SM container includes the PDU Session Establishment Accept message that AMF will provide to the UE. The PDU Session Establishment Accept message contains the S-NSSAI from the allowed NSASI. For the LBO roaming scenario, the PDU Session Establishment Accept message contains the S-NSSAI from the allowed NSSAI for the VPLMN, and also the corresponding S-NSSAI of the HPLMN from the Mapping Of Allowed NSSAI that SMF received in step 3.

Multiple QoS Rules, QoS Flow level QoS parameters if needed for the QoS Flow(s) associated with those QoS rule(s) and QoS Profiles may be included in the PDU Session Establishment Accept within the N1 SM and in the N2 SM information.

If the PDU session establishment failed anywhere between step 5 and step 11, then the N1N2MessageTransfer message shall include the N1 SM container with a PDU Session Establishment Reject message and shall not include any N2 SM container. The (R)AN sends the NAS message containing the PDU Session Establishment Reject to the UE. In this case, steps 12-17 are skipped.

(12) Step 12: The AMF transmits the N2 PDU Session Request message (NAS message including the PDU session ID and PDU Session Establishment Accept message to the UE and the N2 SM information received from the SMF) to (R) AN.

(13) Step 13: (R)AN may perform AN-specific signal exchange with the UE related to the information received from the SMF. For example, in the case of a NG-RAN, an RRC Connection Reconfiguration may take place with the UE establishing the necessary NG-RAN resources related to the QoS Rules for the PDU Session request received in step 12.

(R)AN forwards the NAS message (PDU Session ID, N1 SM container (PDU Session Establishment Accept)) provided in step 12 to the UE. (R)AN shall only provide the NAS message to the UE if the AN specific signaling exchange with the UE includes the (R)AN resource additions associated to the received N2 command.

If the N2 SM information is not included in the step 11, then the following steps 14 to 16b and step 17 are omitted.

Now, the procedure of FIG. 14 following the procedure of FIG. 13 is described.

(14) Step 14: (R) AN transmits an N2 PDU Session Response message to AMF. The N2 PDU session response message may include PDU session ID, cause, N2 SM information (PDU session ID, AN tunnel information, accepted/rejected QFI list, user plane enforcement policy notification), and the like.

If the NG-RAN cannot establish a redundant user plane for the PDU session as indicated by the RSN and PDU Session Pair ID, the NG-RAN takes the decision on whether to reject the establishment of RAN resources for the PDU Session based on local policies.

(15) Step 15: AMF transmits an update SM context request message (e.g., Nsmf_PDUSession_UpdateSMContext Request) to SMF. AMF forwards N2 SM information received from (R) AN to SMF.

(16a) Step 16a: The SMF initiates the N4 Session Modification procedure with the UPF. The SMF provides AN Tunnel Info to the UPF as well as the corresponding forwarding rules.

(16b) Step 16b: The UPF provides an N4 session modification response to the SMF.

After this step, the UPF delivers any down-link packets to the UE that may have been buffered for this PDU Session.

(16c) Step 16c: If the SMF has not yet registered for this PDU session, the SMF may register with the UDM for the given PDU session.

(17) Step 17: The SMF transmits an update SM context response message (eg, Nsmf_PDUSession_UpdateSMContext Response) to the AMF.

After this step, the AMF forwards relevant events subscribed by the SMF.

(18) Step 18: If during the procedure, any time after step 5, the PDU Session establishment is not successful, the SMF may inform the AMF by invoking Nsmf_PDUSession_SMContextStatusNotify (Release). The SMF may also releases any N4 session(s) created, any PDU Session address if allocated (e.g. IP address) and may release the association with PCF, if any. In this case, step 19 may be skipped

(19) Step 19: In the case of PDU Session Type IPv6 or IPv4v6, the SMF may generate an IPv6 Router Advertisement and may send it to the UE.

(20) Step 20: The SMF may perform SM policy association modification initiated by the SMF.

(21) Step 21: If PDU session establishment fails after step 4, the SMF may unsubscribe to the modifications of Session Management Subscription data if the SMF is no more handling a PDU Session of the UE for this.

5. Fifth Embodiment

Figure 15:
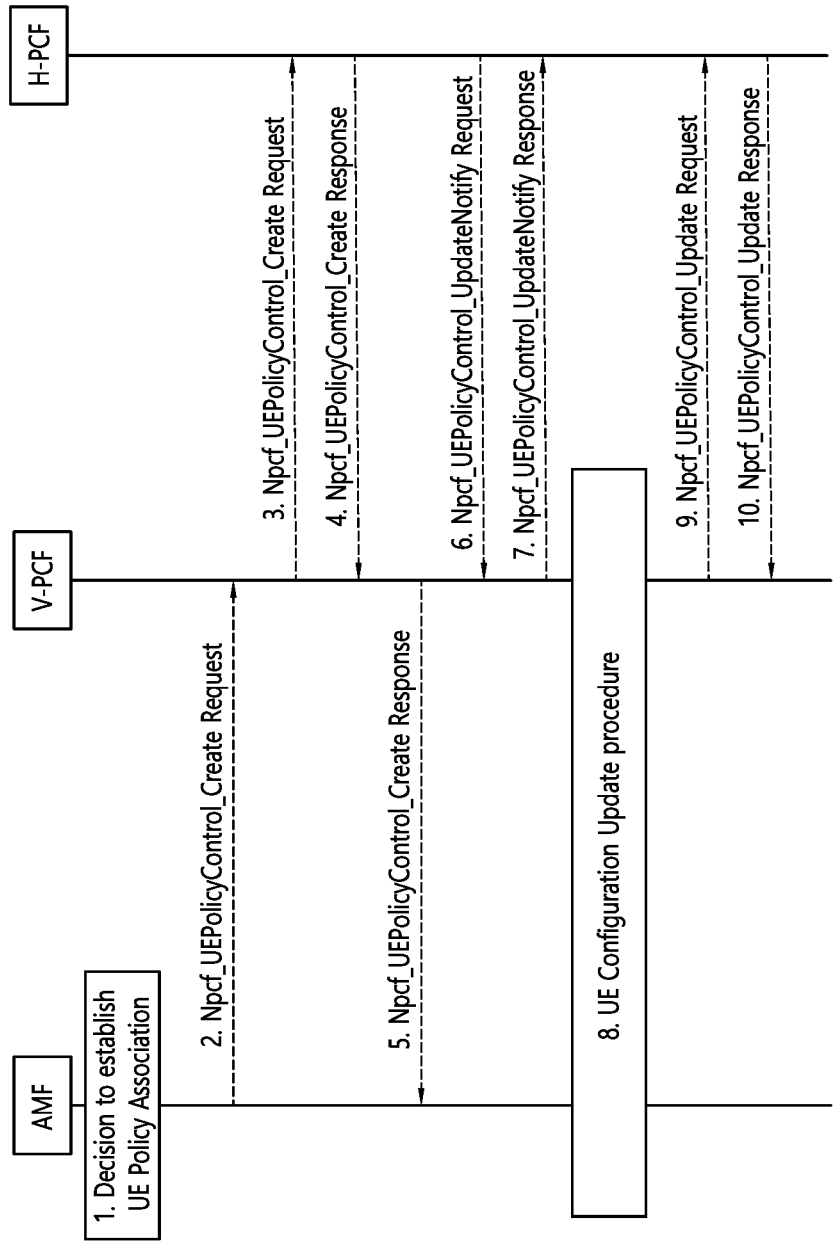
FIG. 15 shows an example of the fifth embodiment of the present specification.

FIG. 15 shows an example of the fifth embodiment of the present specification.

A fifth embodiment may relate to the case of initial registration of a UE with a network. The fifth embodiment may relate to the case of relocation of the AMF due to PCF change in a handover procedure or a registration procedure. The fifth embodiment may relate to the case of registration with 5GS when the UE moves from EPs to 5GS. The fifth embodiment may be related to a case where there is no UE policy association between the AMF and the PCF.

(1) Step 1: The AMF may establish UE Policy Association with the (V-)PCF when a UE Policy Container is received from the UE. If a UE Policy Container is not received from the UE, the AMF may establish UE Policy Association with the (V-)PCF based on AMF local configuration.

(2) Step 2: AMF may send Npcf_UEPolicyControl Create Request to V-PCF.

Npcf_UEPolicyControl Create Request includes SUPI, Access Type and RAT, PEI, ULI, UE time zone, Serving Network (PLMN ID, or PLMN ID and NID), Internal-Group-ID-list and UE Policy Container (the list of stored PSIs, operating system identifier, Indication of UE support for ANDSP).

The Npcf_UEPolicyControl Create Request may include an indication of whether the UE supports the PDU session pair ID.

(3) Step 3: The V-PCF may forward the information received from AMF in step 2 to the H-PCF.

(4) Step 4: The H-PCF may transmit Npcf_UEPolicyControl Create Response to the V-PCF.

(5) Step 5: (V-)PCF may transmit Npcf_UEPolicyControl Create Response to AMF.

(6) Step 6: The H-PCF may transmit an Npcf_UEPolicyControl UpdateNotify Request to the V-PCF.

(7) Step 7: The V-PCF may transmit Npcf_UEPolicyControl UpdateNotify Response to the H-PCF.

(8) Step 8: The (V-)PCF triggers UE Configuration Update Procedure to sends the UE policy container including UE policy information to the UE. The (V-)PCF checks the size limit.

(9) Step 9: The V-PCF may transmit an Npcf_UEPolicyControl_Update Request to the H-PCF.

(10) Step 10: The H-PCF may respond to the V-PCF with Npcf_UEPolicyControl_Update Response.

<URSP>

The UE Route Selection Policy (URSP) includes a prioritized list of URSP rules.

Table 5 shows the URSPs.

TABLE 5

| Information name | Description | Category | PCF permitted to modify in a URSP | Scope |
| --- | --- | --- | --- | --- |
| URSP rules | 1 or more URSP rules | Mandatory | Yes | UE context |

The structures of URSP are shown in Tables 6 and 7. Table 6 shows the URSP rules.

TABLE 6

| Information name | Description | Category | PCF permitted to modify in a UE context | Scope |
|---|---|---|---|---|
| Rule Precedence | Determines the order the URSP rule is enforced in the UE. | Mandatory (NOTE 1) | Yes | UE context |
| Traffic descriptor | This part defines the Traffic descriptor components for the URSP rule. | Mandatory (NOTE 3) | | |
| Application descriptors | It consists of OSId and OSAppId(s). (NOTE 2) | Optional | Yes | UE context |
| IP descriptors (NOTE 5) | Destination IP 3 tuple(s) (IP address or IPv6 network prefix, port number, protocol ID of the protocol above IP). | Optional | Yes | UE context |
| Domain descriptors | Destination FQDN(s) or a regular expression as a domain name matching criteria. | Optional | Yes | UE context |
| Non-IP descriptors (NOTE 5) | Descriptor(s) for destination information of non-IP traffic | Optional | Yes | UE context |
| DNN | This is matched against the DNN information provided by the application. | Optional | Yes | UE context |
| Connection Capabilities | This is matched against the information provided by a UE application when it requests a network connection with certain capabilities. (NOTE 4) | Optional | Yes | UE context |
| List of Route Selection Descriptors | A list of Route Selection Descriptors. The components of a Route Selection Descriptor are described in Table 7. | Mandatory | | |
| Rule Precedence | Determines the order the URSP rule is enforced in the UE. | Mandatory (NOTE 1) | Yes | UE context |

(NOTE 1):
Rules in a URSP shall have different precedence values.
(NOTE 2):
The information is used to identify the Application(s) that is(are) running on the UE's OS. The OSId does not include an OS version number. The OSAppId does not include a version number for the application.
(NOTE 3):
At least one of the Traffic descriptor components shall be present.
(NOTE 4):
The format and some values of Connection Capabilities, e.g. "ims", "mms", "internet", etc., are defined in TS 24.526 [19]. More than one connection capabilities value can be provided.
(NOTE 5):
A URSP rule cannot contain the combination of the Traffic descriptor components IP descriptors and Non-IP descriptors.

Table 7 shows RSD (Route Selection Descriptor).

TABLE 7

| Information name | Description | Category | PCF permitted to modify in URSP | Scope |
|---|---|---|---|---|
| Route Selection Descriptor Precedence | Determines the order in which the Route Selection Descriptors are to be applied. | Mandatory (NOTE 1) | Yes | UE context |
| Route selection components | This part defines the route selection components | Mandatory (NOTE 2) | | |
| SSC Mode Selection | One single value of SSC mode. (NOTE 5) | Optional | Yes | UE context |
| Network Slice Selection | Either a single value or a list of values of S-NSSAI(s). | Optional (NOTE 3) | Yes | UE context |
| DNN Selection | Either a single value or a list of values of DNN(s). | Optional | Yes | UE context |
| PDU Session | One single value of PDU | Optional | Yes | UE context |

TABLE 7-continued

| Information name | Description | Category | PCF permitted to modify in URSP | Scope |
|---|---|---|---|---|
| Type Selection | Session Type | (NOTE 8) | | |
| Non-Seamless Offload indication | Indicates if the traffic of the matching application is to be offloaded to non-3GPP access outside of a PDU Session. | Optional (NOTE 4) | Yes | UE context |
| Access Type preference | Indicates the preferred Access Type (3GPP or non-3GPP or Multi-Access) when the UE establishes a PDU Session for the matching application. | Optional | Yes | UE context |
| PDU Session Pair Identifier | Indicates which PDU sessions are paired for redundant transmission when the UE establishes a redundant PDU Session | Optional | Yes | UE context |
| Route Selection Validation Criteria (NOTE 6) | This part defines the Route Validation Criteria components | Optional | | |
| Time Window | The time window when the matching traffic is allowed. The RSD is not considered to be valid if the current time is not in the time window. | Optional | Yes | UE context |
| Location Criteria | The UE location where the matching traffic is allowed. The RSD rule is not considered to be valid if the UE location does not match the location criteria. | Optional | Yes | UE context |

(NOTE 1):
Every Route Selection Descriptor in the list shall have a different precedence value.
(NOTE 2):
At least one of the route selection components shall be present.
(NOTE 3)
When the Subscription Information contains only one S-NSSAI in UDR, the PCF needs not provision the UE with S-NSSAI in the Network Slice Selection information. The "match all" URSP rule has one S-NSSAI at most.
(NOTE 4):
If this indication is present in a Route Selection Descriptor, no other components shall be included in the Route Selection Descriptor.
(NOTE 5):
The SSC Mode 3 shall only be used when the PDU Session Type is IP.
(NOTE 6):
The Route Selection Descriptor is not considered valid unless all the provided Validation Criteria are met.
NOTE 7:
In this Release of specification, inclusion of the Validation Criteria in Roaming scenarios is not considered.
(NOTE 8):
When the PDU Session Type is "Ethernet" or "Unstructured", this component shall be present.

Each URSP rule contains a Traffic descriptor (containing one or more components described in Table 4) that determines when the rule is applicable. A URSP rule is determined to be applicable when every component in the Traffic descriptor matches the corresponding information from the application.

If No corresponding information from the application is available or The corresponding information from the application does not match any of the values in the Traffic descriptor component, a URSP rule is determined not to be applicable when for any given component in the Traffic descriptor.

It is recommended to avoid listing more than two components in the Traffic descriptor of a URSP rule.

If a URSP rule is provided that contains a Traffic descriptor with two or more components, it is recommended to also provide URSP rule(s) with lower precedence and a Traffic descriptor with less components, in order to increase the likelihood of URSP rule matching for a particular application.

Each URSP rule contains a list of Route Selection Descriptors containing one or multiple Route Selection Descriptors each having a different Route Selection Descriptor Precedence value. A Route Selection Descriptor contains one or more of the following components:

Session and Service Continuity (SSC) Mode: Indicates that the traffic of the matching application shall be routed via a PDU Session supporting the included SSC Mode.

Network Slice Selection: Indicates that the traffic of the matching application shall be routed via a PDU Session supporting any of the included S-NSSAIs. It includes one or more S-NSSAI(s).

DNN Selection: Indicates that the traffic of the matching application shall be routed via a PDU Session supporting any of the included DNNs. It includes one or more DNN(s). When DNN is used in Traffic descriptor, corresponding Route Selection Descriptor of the rule shall not include DNN Selection component.

PDU Session Type Selection: Indicates that the traffic of matching application shall be routed via a PDU Session supporting the included PDU Session Type.

Non-Seamless Offload indication: Indicates that traffic of the matching application is to be offloaded to non-3GPP access outside of a PDU Session when the rule is applied. If this component is present in a Route Selection Descriptor, no other components shall be included in the Route Selection Descriptor.

Access Type Preference: If the UE needs to establish a PDU Session when the rule is applied, this indicates the Access Type (3GPP or non-3GPP or multi-access) on which the PDU Session should be established. The type "Multi-Access" indicates that the PDU Session should be established as a MA PDU Session, using both 3GPP access and non-3GPP access.

PDU Session Pair Identifier: Indicates which PDU sessions are paired for redundant transmission when the UE establishes a redundant PDU Session.

Time Window: The Route Selection Descriptor is not be considered valid unless the UE is in the time window.

Location Criteria: The Route Selection Descriptor is not be considered valid unless the UE's location matches the Location Criteria.

The structure of the URSP does not define how the PCF splits the URSP when URSP cannot be delivered to the UE in a single NAS message.

It is expected that UE applications will not be able to change or override the PDU Session parameters in the URSP rules. A UE application can express preferences when it requests a network connection (e.g. certain Connection Capabilities), which can be mapped into specific PDU Session parameters by the URSP rules.

When one Route Selection Descriptor in a URSP rule contains a Time Window or Location Criteria, all Route Selection Descriptors in the URSP rule must contain a Time Window or Location Criteria.

In the case of network rejection of the PDU Session Establishment Request, the UE may trigger a new PDU Session establishment based on the rejection cause and the URSP policy.

When the PCF provisions URSP rules to the UE, one URSP rule with a "match all" Traffic descriptor may be included.

When URSP rules containing NSSP are available to the UE and the URSP rule with the "match all" Traffic descriptor is not part of them, a UE application that has no matching URSP rule and no UE Local Configuration cannot request a network connection.

The URSP rule with the "match all" Traffic descriptor is used to route the traffic of applications which do not match any other URSP rules and shall therefore be evaluated as the last URSP rule, i.e. with lowest priority. There shall be only one Route Selection Descriptor in this URSP rule. The Route Selection Descriptor in this URSP rule includes at most one value for each Route Selection Component.

6. Sixth Embodiment

The sixth embodiment provides a method of configuring PDU Session Pair ID information and RSN information in a UE.

Redundant PDU Session (RPS) related information (RPS Policy/Parameters) may be configured in the UE. The information related to the redundant PDU Session may be one or more of PDU session pair ID information and RSN information. These configuration may be configured in the UE's UICC and/or ME. Alternatively, it may be configured or updated from a network (e.g., PCF, AMF, etc.). The configuration may be in the form of one or more of the following:

i) Mapping of Traffic Descriptor for PDU Session that requires redundant transmission to PDU Session Pair ID information and/or RSN information.

ii) Mapping of DNN and/or S-NSSAI for PDU Session that requires redundant transmission to PDU Session Pair ID information and/or RSN information.

iii) Mapping of Route Selection Descriptor for PDU Session that requires redundant transmission to PDU Session Pair ID information and/or RSN information.

A PDU session requiring redundant transmission may mean a PDU session for URLLC service or to support URLLC QoS Flow.

Two or more of mapping information having the same PDU Session Pair ID are configured in the UE. In other words, two or more PDU sessions corresponding to the same PDU session Pair ID are PDU sessions used for redundant transmission.

When the UE creates a PDU session for redundant transmission based on the configuration, the UE provides PDU session pair ID information and/or RSN information to the network (i.e., SMF). Upon receiving this, the SMF may provide the information to the RAN.

For example, if the following configuration is performed on the UE, the PDU session generated corresponding to Traffic_Descriptor #A and the PDU session generated corresponding to Traffic_Descriptor #B are PDU sessions used for redundant transmission (i.e. paired PDU sessions). The UE provides PDU session Pair ID #1 and/or RSN #x information when requesting generation of a PDU session generated corresponding to Traffic_Descriptor #A through SMF. In addition, the UE provides PDU session Pair ID #1 and/or RSN #y information when requesting generation of a PDU session generated corresponding to Traffic_Descriptor #B through SMF.

Mapping of Traffic_Descriptor #A for PDU Session that requires redundant transmission to PDU Session Pair ID #1 and/or RSN #x Mapping of Traffic_Descriptor #B for PDU Session that requires redundant transmission to PDU Session Pair ID #1 and/or RSN #y For example, if the following configuration is performed in the UE, a PDU session generated corresponding to DNN #a and/or S-NSSAI #a and a PDU session generated corresponding to DNN #b and/or S-NSSAI #b are PDU sessions used for redundant transmission (i.e., paired PDU sessions). When requesting generation of a PDU session generated corresponding to DNN #a and/or S-NSSAI #a through SMF, the UE provides PDU Session Pair ID #2 and/or RSN #X information. In addition, the UE provides PDU Session Pair ID #2 and/or RSN #Y information when requesting generation of a PDU Session generated corresponding to DNN #b and/or S-NSSAI #b through SMF.

Mapping of DNN #a and/or S-NSSAI #a for PDU Session that requires redundant transmission to PDU Session Pair ID #2 and/or RSN #X Mapping of DNN #b and/or S-NSSAI #b for PDU Session that requires redundant transmission to PDU Session Pair ID #2 and/or RSN #Y In the above, the UE may check the RPS Policy/Parameters for the creation of all PDU sessions and apply the corresponding information if there is information. However, information that checking existence of RPS Policy/Parameters by the UE is necessary may be included in the URSP.

For example, if the UE has a configuration in the form of i) above, information that checking existence of the RPS policy/Parameters by the UE in RSD information or newly defined information matched/corresponded the Traffic Descriptor in the URSP is necessary may be included.

For example, if the UE has a configuration in the form of ii) above, information that checking existence of the RPS policy/Parameters by the UE in the RSD along with the corresponding DNN and/or S-NSSAI of the URSP or other newly defined information in the URSP is necessary may be included.

Figure 16:
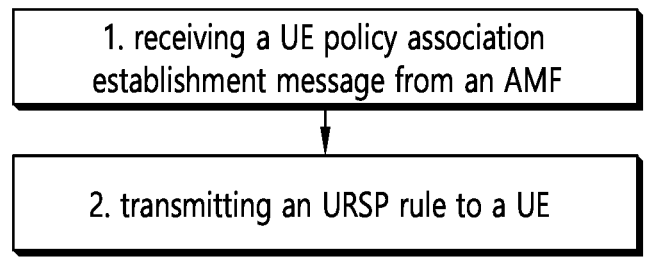
FIG. 16 shows the procedure of PCF for disclosure of the present specification.

FIG. 16 shows the procedure of PCF for disclosure of the present specification.

(1) step 1: the PCF may receive, from an AMF (Access and Mobility management Function), a UE (User Equipment) policy association establishment message.

(2) step 2: the PCF may transmit, to a UE, an URSP (UE route selection policy) rule.

The URSP rule may include a first RSD (Route Selection Descriptor) and a second RSD.

The first RSD may include a PDU (Protocol Data Unit) session Pair ID (identifier).

The PDU session Pair ID may be used to establish two redundant PDU sessions.

The second RSD may not include the PDU session Pair ID.

The first RSD may have a higher priority value than the second RSD.

The PDU session Pair ID may indicate the two redundant PDU sessions.

The two redundant PDU sessions may be paired for redundant transmission.

Figure 17:
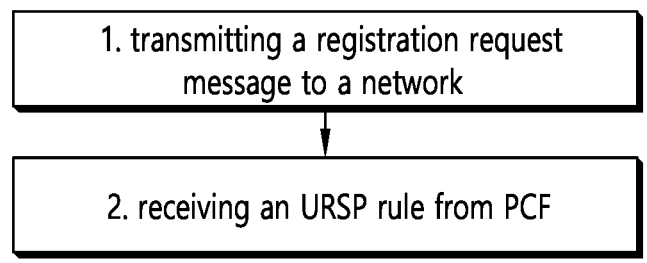
FIG. 17 shows the procedure of UE for disclosure of the present specification.

FIG. 17 shows the procedure of UE for disclosure of the present specification.

(1) step 1: the UE may transmit, to a network, a registration request message.

The network may be NG-RAN. The network may be AMF.

(2) step 2: the UE may receive, from PCF (Policy Control Function), an URSP (UE route selection policy) rule.

The URSP rule may include a first RSD (Route Selection Descriptor) and a second RSD.

The first RSD may include a PDU (Protocol Data Unit) session Pair ID (identifier).

The PDU session Pair ID may used to establish two redundant PDU sessions.

The second RSD may not include the PDU session Pair ID.

The first RSD may have a higher priority value than the second RSD.

The PDU session Pair ID may indicate the two redundant PDU sessions.

The two redundant PDU sessions may be paired for redundant transmission.

The UE may check the first RSD. The UE may skip to check the second RSD, based on the UE recognizing the PDU session Pair ID in the first RSD. The UE may perform procedure for establishing the two redundant PDU sessions based on the first RSD, based on the UE recognizing the PDU session Pair ID in the first RSD.

The UE may check the first RSD. The UE may check the second RSD, based on the UE not recognizing the PDU session Pair ID in the first RSD. The UE may perform procedure for establishing the two redundant PDU sessions based on the second RSD, based on the UE not recognizing the PDU session Pair ID in the first RSD.

Hereinafter, a processor for providing communication in a wireless communication system according to some embodiments of the present specification will be described.

For example, PCF may include a processor, transceiver and memory.

For example, a processor may be configured to be operably coupled with a memory and a processor.

The processor may perform operation, comprising: receiving, from an AMF (Access and Mobility management Function), a UE (User Equipment) policy association establishment message.

The processor may perform operation, comprising: receiving, from an AMF (Access and Mobility management Function), a UE (User Equipment) policy association establishment message; transmitting, to a UE, an URSP (UE route selection policy) rule, wherein the URSP rule includes a first RSD (Route Selection Descriptor) and a second RSD, wherein the first RSD includes a PDU (Protocol Data Unit) session Pair ID (identifier), wherein the PDU session Pair ID is used to establish two redundant PDU sessions, wherein the second RSD does not include the PDU session Pair ID.

Hereinafter, a non-volatile computer-readable medium storing one or more instructions for providing communication according to some embodiments of the present specification will be described.

According to some embodiments of the present disclosure, the technical features of the present disclosure may be directly implemented as hardware, software executed by a processor, or a combination of the two. For example, in wireless communication, a method performed by a wireless device may be implemented in hardware, software, firmware, or any combination thereof. For example, the software may reside in RAM memory, flash memory, ROM memory, EPROM memory, EEPROM memory, registers, hard disk, removable disk, CD-ROM, or other storage medium.

Some examples of a storage medium are coupled to the processor such that the processor can read information from the storage medium. Alternatively, the storage medium may be integrated into the processor. The processor and storage medium may reside in the ASIC. For another example, a processor and a storage medium may reside as separate components.

Computer-readable media can include tangible and non-volatile computer-readable storage media.

For example, non-volatile computer-readable media may include random access memory (RAM), such as synchronization dynamic random access memory (SDRAM), read-only memory (ROM), or non-volatile random access memory (NVRAM). Read-only memory (EEPROM), flash memory, magnetic or optical data storage media, or other media that can be used to store instructions or data structures or Non-volatile computer readable media may also include combinations of the above.

Further, the methods described herein may be realized at least in part by computer-readable communication media that carry or carry code in the form of instructions or data structures and that can be accessed, read, and/or executed by a computer.

According to some embodiments of the present disclosure, a non-transitory computer-readable medium has one or more instructions stored thereon. The stored one or more instructions may be executed by a processor of the UE.

The stored one or more stored instructions cause processors to: receiving, from an AMF (Access and Mobility management Function), a UE (User Equipment) policy association establishment message; transmitting, to a UE, an URSP (UE route selection policy) rule, wherein the URSP rule includes a first RSD (Route Selection Descriptor) and a second RSD, wherein the first RSD includes a PDU (Protocol Data Unit) session Pair ID (identifier), wherein the PDU session Pair ID is used to establish two redundant PDU sessions, wherein the second RSD does not include the PDU session Pair ID.

The present specification may have various effects.

For example, through the procedure disclosed in this specification, the network can establish a redundant PDU session by integrally managing a terminal that supports a PDU session pair ID and a terminal that does not support a PDU session pair ID.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method. Other implementations are within the scope of the following claims.

What is claimed is:

1. A method for performing communication, performed by a PCF (Policy Control Function), comprising:
   receiving, from an AMF (Access and Mobility management Function), a UE (User Equipment) Policy Container;
   transmitting, to a UE, an URSP (UE route selection policy) rule,
   wherein the URSP rule includes a first RSD (Route Selection Descriptor) and a second RSD,
   wherein the first RSD includes a PDU (Protocol Data Unit) session Pair ID (identifier),
   wherein the PDU session Pair ID is used to establish two redundant PDU sessions,
   wherein the second RSD does not include the PDU session Pair ID.

2. The method of claim 1,
   wherein the first RSD has a higher priority value than the second RSD.

3. The method of claim 1,
   wherein the PDU session Pair ID indicates the two redundant PDU sessions.

4. The method of claim 1,
   wherein the two redundant PDU sessions are paired for redundant transmission.

5. The method of claim 1,
   wherein the UE Policy Container includes information on whether the UE supports a PDU session Pair ID.

6. A method for performing communication, performed by a UE (User Equipment), comprising:
   transmitting, to a base station, a registration request message;
   receiving, from PCF (Policy Control Function), an URSP (UE route selection policy) rule,
   wherein the URSP rule includes a first RSD (Route Selection Descriptor) and a second RSD,
   wherein the first RSD includes a PDU (Protocol Data Unit) session Pair ID (identifier),
   wherein the PDU session Pair ID is used to establish two redundant PDU sessions,
   wherein the second RSD does not include the PDU session Pair ID.

7. The method of claim 6,
   wherein the first RSD has a higher priority value than the second RSD.

8. The method of claim 6,
   wherein the PDU session Pair ID indicates the two redundant PDU sessions.

9. The method of claim 6,
   wherein the two redundant PDU sessions are paired for redundant transmission.

10. The method of claim 6, further comprising:
    checking the first RSD;
    skipping to check the second RSD, based on the UE recognizing the PDU session Pair ID in the first RSD;
    performing procedure for establishing the two redundant PDU sessions based on the first RSD, based on the UE recognizing the PDU session Pair ID in the first RSD.

11. The method of claim 6, further comprising:
    checking the first RSD;
    checking the second RSD, based on the UE not recognizing the PDU session Pair ID in the first RSD;
    performing procedure for establishing the two redundant PDU sessions based on the second RSD, based on the UE not recognizing the PDU session Pair ID in the first RSD.

12. The method of claim 6,
    wherein the registration request message includes information on whether the UE supports a PDU session Pair ID.

13. A PCF (Policy Control Function), comprising:
    a transceiver to transmit a signal and to receive a signal; and
    a processor to control the transceiver,
    wherein the transceiver receives, from an AMF (Access and Mobility management Function), a UE (User Equipment) Policy Containerpolicy association establishment message;
    wherein the transceiver transmits, to a UE, an URSP (UE route selection policy) rule,
    wherein the URSP rule includes a first RSD (Route Selection Descriptor) and a second RSD,
    wherein the first RSD includes a PDU (Protocol Data Unit) session Pair ID (identifier),
    wherein the PDU session Pair ID is used to establish two redundant PDU sessions,
    wherein the second RSD does not include the PDU session Pair ID.

* * * * *